US012564977B2

(12) United States Patent
Claus et al.

(10) Patent No.: US 12,564,977 B2
(45) Date of Patent: Mar. 3, 2026

(54) RAZOR BLADE

(71) Applicant: The Gillette Company LLC, Boston, MA (US)

(72) Inventors: Oliver Heinz Claus, Walpole, MA (US); Eduardo Villarreal, Needham, MA (US); Neville Sonnenberg, Newton, MA (US); Joseph Allan Depuydt, Salem, NH (US); Dieter Heinz Josef Gross, Mainz (DE); Marko Limpert-Kiesel, Eschborn (DE)

(73) Assignee: The Gillette Company LLC, Boston, MA (US)

( * ) Notice: Subject to any disclaimer, the term of this patent is extended or adjusted under 35 U.S.C. 154(b) by 142 days.

(21) Appl. No.: 18/488,470

(22) Filed: Oct. 17, 2023

(65) Prior Publication Data

US 2025/0121518 A1 Apr. 17, 2025

(51) Int. Cl.
*B26B 21/22* (2006.01)
*B26B 21/40* (2006.01)

(52) U.S. Cl.
CPC ........ *B26B 21/222* (2013.01); *B26B 21/4037* (2013.01); *B26B 21/4068* (2013.01)

(58) Field of Classification Search
CPC ..... B26B 21/4068; B26B 21/58; B26B 21/60; B26B 21/222; B26B 21/56; B26B 21/4037
USPC ...................... 30/32, 47, 48, 49, 50, 51, 346
See application file for complete search history.

(56) References Cited

U.S. PATENT DOCUMENTS

| | | | | |
|---|---|---|---|---|
| 1,499,698 | A * | 7/1924 | Schoenert | B26B 21/56 30/34.05 |
| 4,211,006 | A | 7/1980 | Halaby et al. | |
| 5,121,660 | A * | 6/1992 | Kramer | B26B 21/54 76/DIG. 8 |
| 5,329,700 | A * | 7/1994 | Ferraro | B26B 21/56 30/41 |
| 2004/0143975 | A1* | 7/2004 | Hamada | B26B 21/56 30/346.57 |
| 2005/0188548 | A1* | 9/2005 | Daskal | A61B 17/3211 216/2 |
| 2012/0276826 | A1* | 11/2012 | Floter | B26B 21/60 451/552 |

FOREIGN PATENT DOCUMENTS

| | | |
|---|---|---|
| EP | 0523170 | 1/1996 |
| EP | 2303525 | 11/2016 |

OTHER PUBLICATIONS

All Office Actions; U.S. Appl. No. 18/488,509, filed on Oct. 17, 2023.
Unpublished U.S. Appl. No. 18/488,509, filed Oct. 17, 2023, to Oliver Heinz Claus et al.
PCT/US2024/051320 Search Report Dated Jan. 27, 2025.

* cited by examiner

*Primary Examiner* — Adam J Eiseman
*Assistant Examiner* — Robert D Cornett
(74) *Attorney, Agent, or Firm* — John M. Lpchitz

(57) ABSTRACT

A razor blade. The razor blade includes a substrate having a first facet and a second facet that converge to define a cutting edge. A first textured surface is formed on the first facet and includes a first plurality of elements with a depth between about 0.01 μm and about 20 μm. The first textured surface is spaced apart from the cutting edge by about 0.05 μm to about 2 μm.

14 Claims, 35 Drawing Sheets

RAZOR BLADE

FIELD OF THE INVENTION

The present invention relates to razor blades and more particularly to razor blades having textured surfaces on a first facet and/or second facet of the razor blade.

BACKGROUND OF THE INVENTION

Typically, shaving razors have razor blades that have planar facets that converge to form the cutting edge of the razor blade. However, the planar surfaces of the facets produce friction between the razor blade and the skin and hair of a user during shaving, which can increase the cutting force required for the razor blades to cut through the hair. This decreases the comfort sensations of shaving by increasing the pull and tug of hairs from the follicle.

Therefore, razor blades for shaving razors are needed that reduce the friction as the razor blade passes over the skin and cut through the hair of a user, thus reducing the cutting force required for the razor blade to cut the hair.

SUMMARY OF THE INVENTION

The present invention relates to a razor blade and to a shaving razor cartridge and a shaving razor that include the razor blade.

In one implementation, the razor blade can comprise a substrate having a first facet and a second facet that converge to define a cutting edge. A first textured surface is formed on the first facet and includes a first plurality of elements with a depth between about 0.01 μm and about 20 μm. The first textured surface is spaced apart from the cutting edge by about 0.05 μm to about 2 μm.

The razor blade can comprise a second textured surface form on the second facet that includes a second plurality of elements with a depth between about 0.01 μm and about 20 μm and the second textured surface is spaced apart from the cutting edge by about 0.05 μm to about 2 μm.

The first plurality of elements on the first facet can be offset from the second plurality of elements on the second facet.

The razor blade can comprise a conforming first coating covering at least the cutting edge.

The conforming first coating can cover the first textured surface.

The depth of the first plurality of elements can increase with increasing distance from the cutting edge.

The first plurality of elements can be spaced apart from each other by a distance of 1 μm to about 50 μm.

The first plurality of elements can comprise a first plurality of grooves extending into a top surface of the first facet and longitudinally parallel to the cutting edge.

The first plurality of elements can comprise a second plurality of grooves extending into a top surface of the first facet and perpendicular to the cutting edge.

The first plurality of elements can comprise a first plurality of grooves extending into a top surface of the first facet and longitudinally parallel to the cutting edge, and a second plurality of grooves extending into a top surface of the first facet and perpendicular to the cutting edge.

The first plurality of elements can comprise a first plurality of grooves extending into a top surface of the first facet and longitudinally parallel to the cutting edge, and a third plurality of grooves extending into a top surface of the first facet and at an angle of about 20 degrees to about 70 degrees relative to the cutting edge.

The first plurality of elements can comprise a plurality of dimples.

The plurality of dimples can have a circular or oval shape at a top surface of the first facet.

The first plurality of elements can comprise a plurality of V shaped grooves extending into a top surface of the first facet.

The first plurality of elements can form a bio-inspired pattern.

Each of the first plurality of elements can comprise an arcuate base surface.

The first textured surface can extend about 2 μm to about 40 μm in a direction perpendicular to the cutting edge.

Each of the first plurality of elements can have a width of about 1 μm to about 50 μm.

A shaving razor cartridge can include the razor blade. The shaving razor cartridge can comprise a housing having a front portion and a rear portion, wherein the razor blade is retained within the housing and positioned between the front portion and the rear portion.

A shaving razor can include the razor blade. The shaving razor can comprise a blade platform configured to support the razor blade and a housing cover removably secured on top of the blade platform.

BRIEF DESCRIPTION OF THE DRAWINGS

While the specification concludes with claims particularly pointing out and distinctly claiming the subject matter that is regarded as forming the present invention, it is believed that the invention will be better understood from the following description, which is taken in conjunction with the accompanying drawings in which like designations are used to designate substantially identical elements, and in which:

DETAILED DESCRIPTION OF THE INVENTION

The examples described herein relate to razor blades and shaving razor cartridges and shaving razors using the razor blades. The example shaving razor cartridges and shaving razors herein can include razor blades that have textured surfaces etched into a first facet and/or a second facet of the razor blade by laser ablation/etching to make the surface(s) hydrophilic or hydrophobic and to decrease the friction between the razor blade and the skin and hair of a user during shaving, which in turn reduces the cutting force of the razor blades through the hair. This improves the comfort sensations of wet shaving by reducing the pull and tug of hairs from the follicle. Benefits can be realized by having the textured surfaces etched into each of the first facet and the second facet of the razor blade. On the first facet (skin facing side), lower friction created by the textured surfaces can improve gliding and reduce skin irritation. On the second facet (hair facing side), lower friction created by the textured surfaces can reduce the force to cut through hair, thereby reducing pull and tug and improving comfort.

Various patterns could be etched into the first facet and/or second facet of the razor blades of the shaving razors to decrease friction and create the feeling of glide and reduce the cutting force through hair, depending on the particular application. It is believed, without being held to theory, that some of the surface textures disclosed facilitate the trapping of water and shaving aid that a consumer may use for shaving on the first facet and/or second facet of the razor blades, as well as removing some of the higher friction metal material from the shaving surface, thus lowering surface friction and improving glide for a more comfortable shave. In addition, the surface textures may also be easily rinsed clean between shaves (e.g., surface texture does not trap shaving debris).

Figure 1:
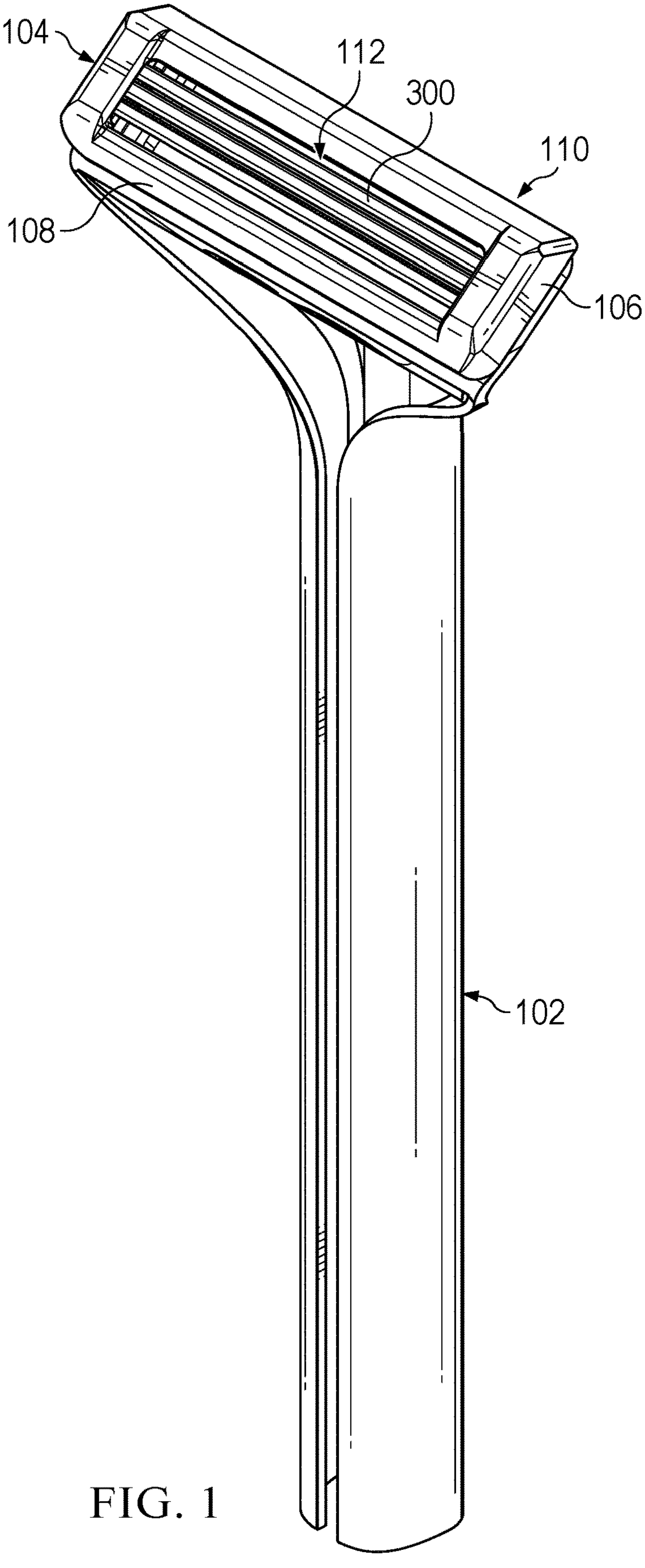
FIG. 1 is a top perspective view of a first example shaving razor.
Figure 2:
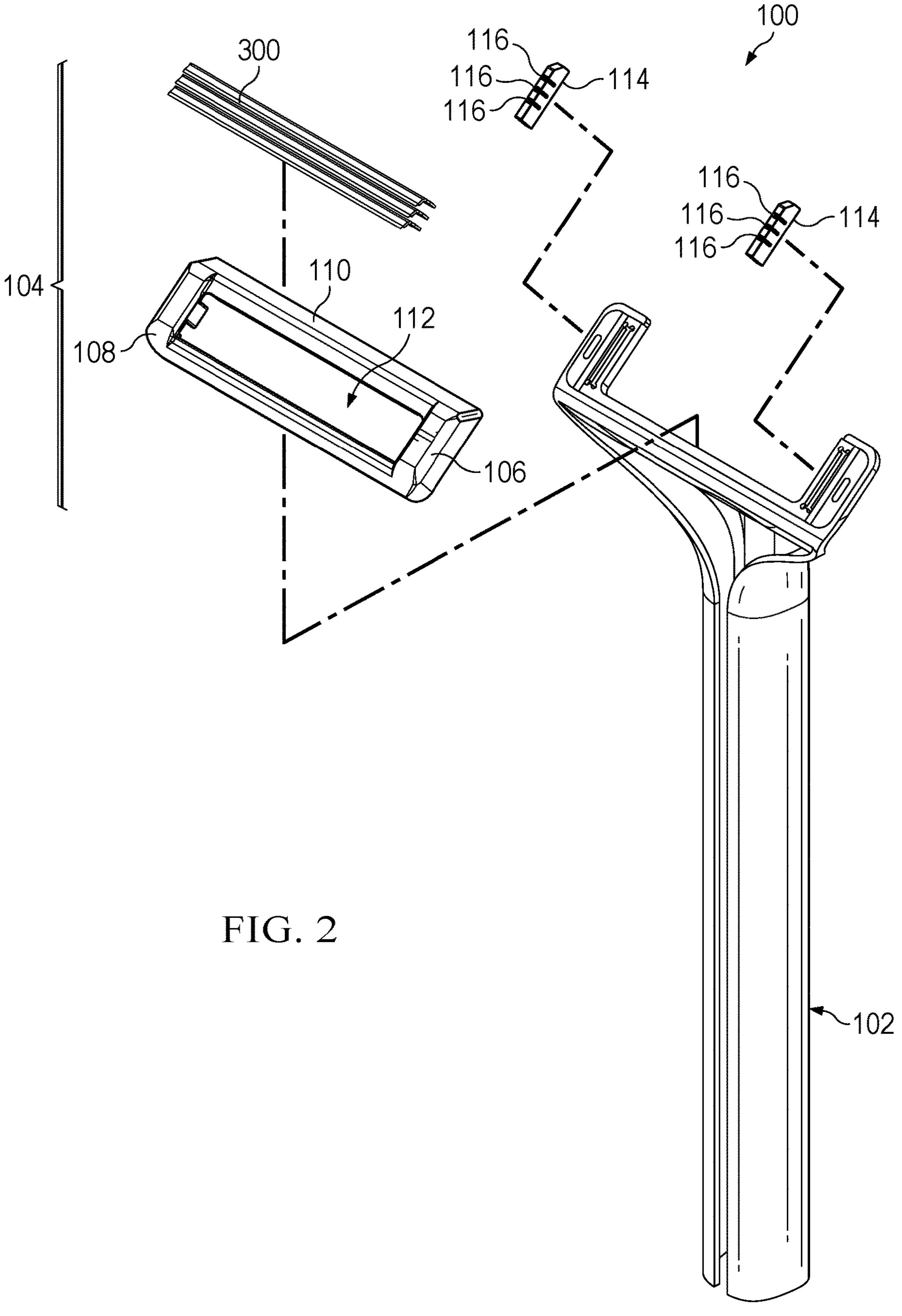
FIG. 2 is an exploded view of the shaving razor of FIG. 1.

Referring to FIGS. 1-2, a first example shaving razor 100 is shown, which generally includes a handle 102 and a shaving razor cartridge 104, which can be connected to, or removably connected to, handle 102. Shaving razor cartridge 104 generally includes a housing 106, which can be plastic or a metal material, such as aluminum, anodized aluminum, stainless steel, titanium, etc. with a Brinell hardness of 30 to 100, a blade platform 114, and at least one razor blade 300. As shown, razor blade(s) 300 can be mounted to blade platform 114 by positioning razor blade(s) 300 within slots 116 formed in blade platform 114. Housing 106 can cover blade platform 114 such that razor blade(s) 300 are retained within housing 106, are positioned between a front portion 108 and a rear portion 110 of housing 106, and are accessible through an elongated window 112 formed in housing 106 between front portion 108 and rear portion 110. As referred to herein, front portion 108 of housing 106 is the portion of housing 106 that engages the skin of a user before razor blade(s) 300 and rear portion 110 of housing 106 is the portion of housing 106 that engages the skin of the user after razor blade(s) 300.

Although the particular example shaving razor cartridge 104 is shown and described herein as having housing 106 and a separate blade platform 114, it is understood that the housing and blade platform could be formed together as a single, integral housing that holds the razor blades.

Figure 8A:
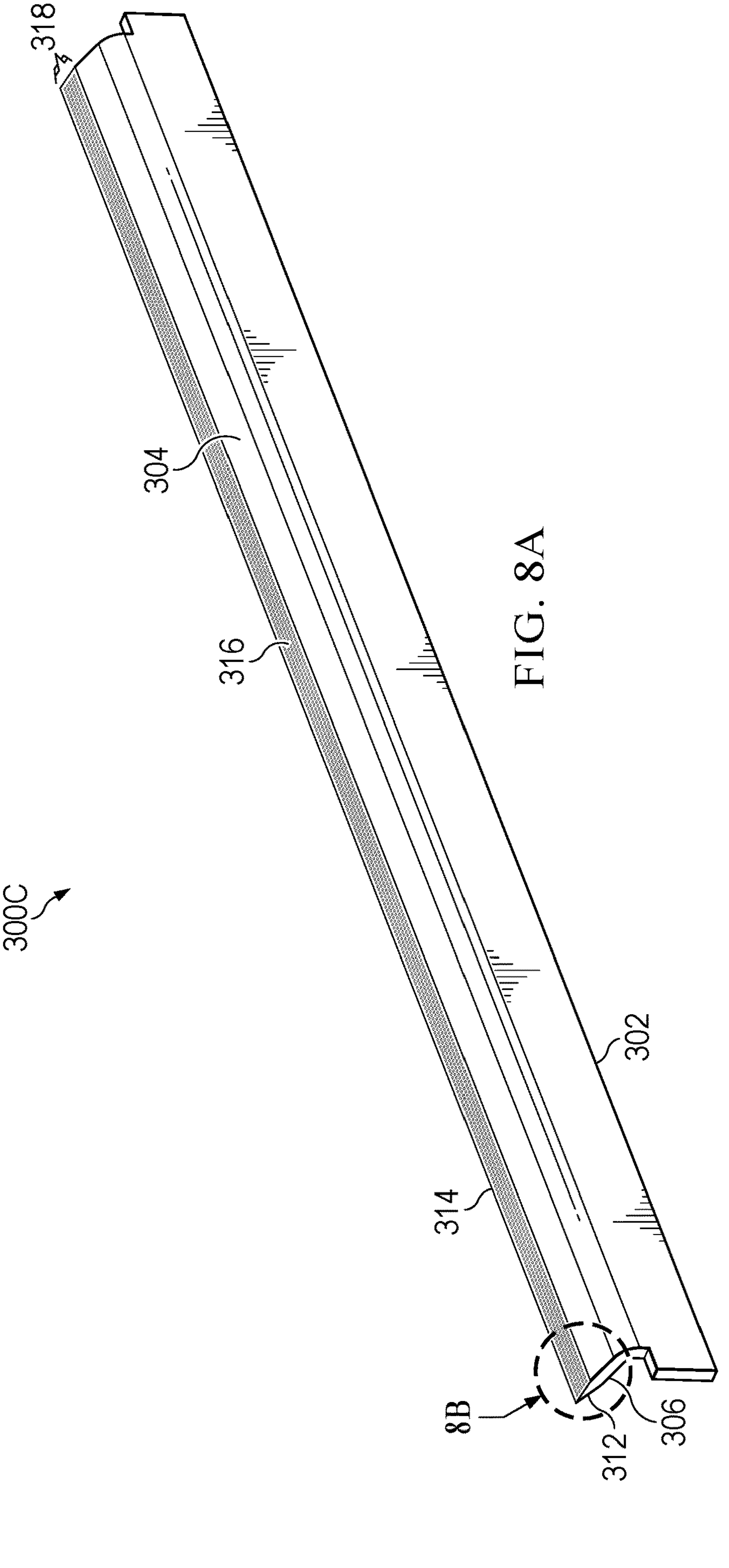
FIG. 8A is a top perspective view of a third example razor blade for use in the shaving razor of FIG. 1.
Figure 8B:
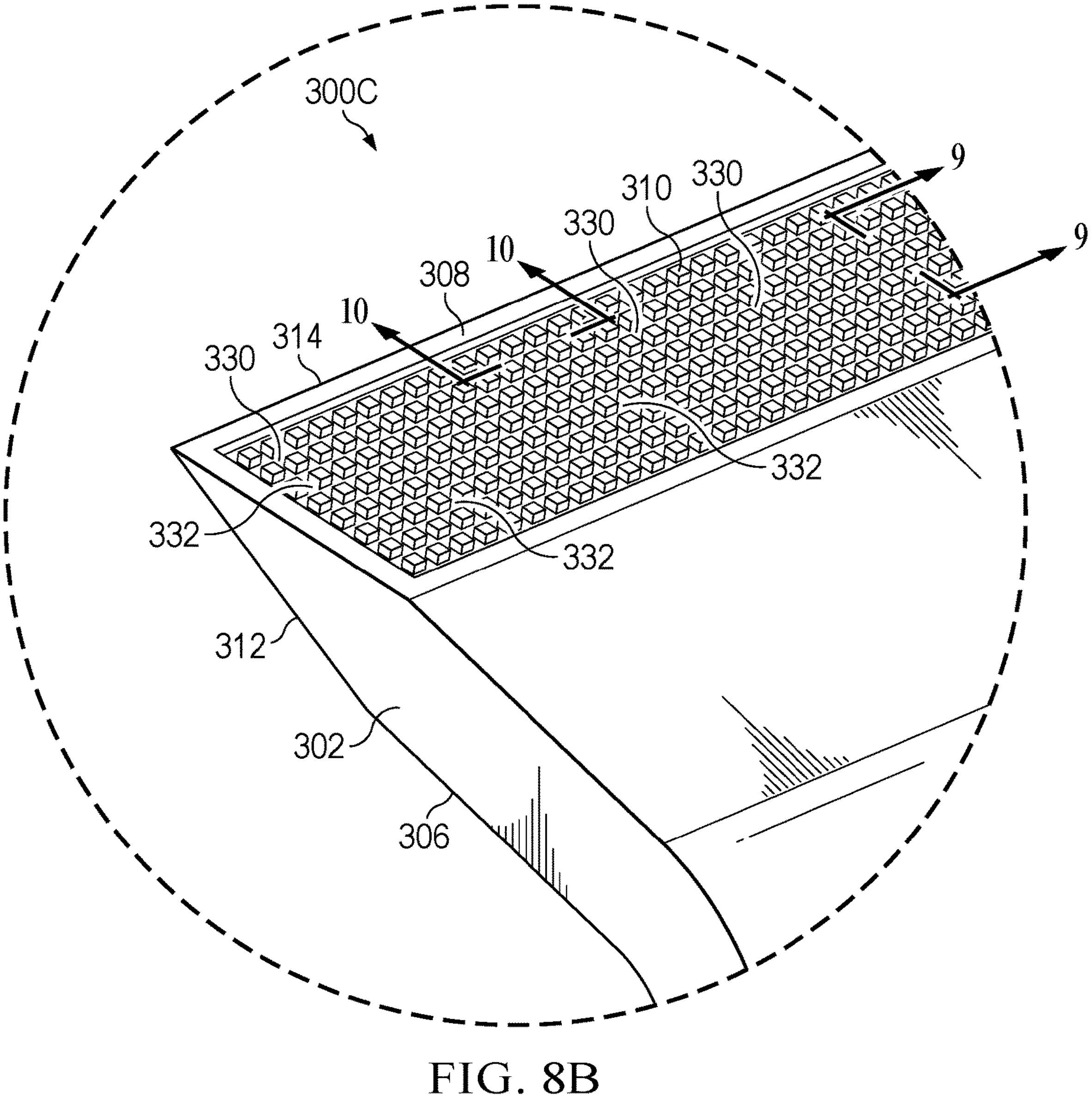
FIG. 8B is an enlarged view of a portion of the razor blade of FIG. 8A.
Figure 9:
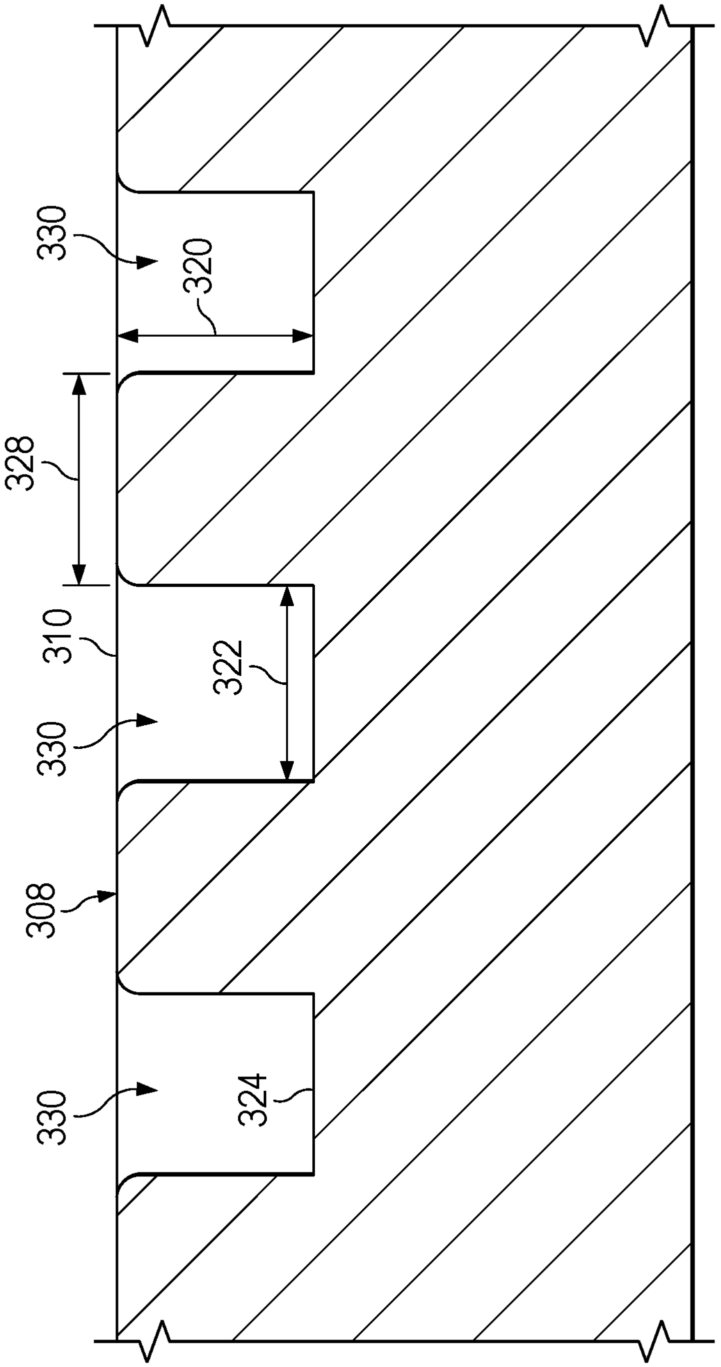
FIG. 9 is a cross-sectional view of a portion of the razor blade of FIG. 8A taken along the line 9-9 of FIG. 8B.
Figure 10:
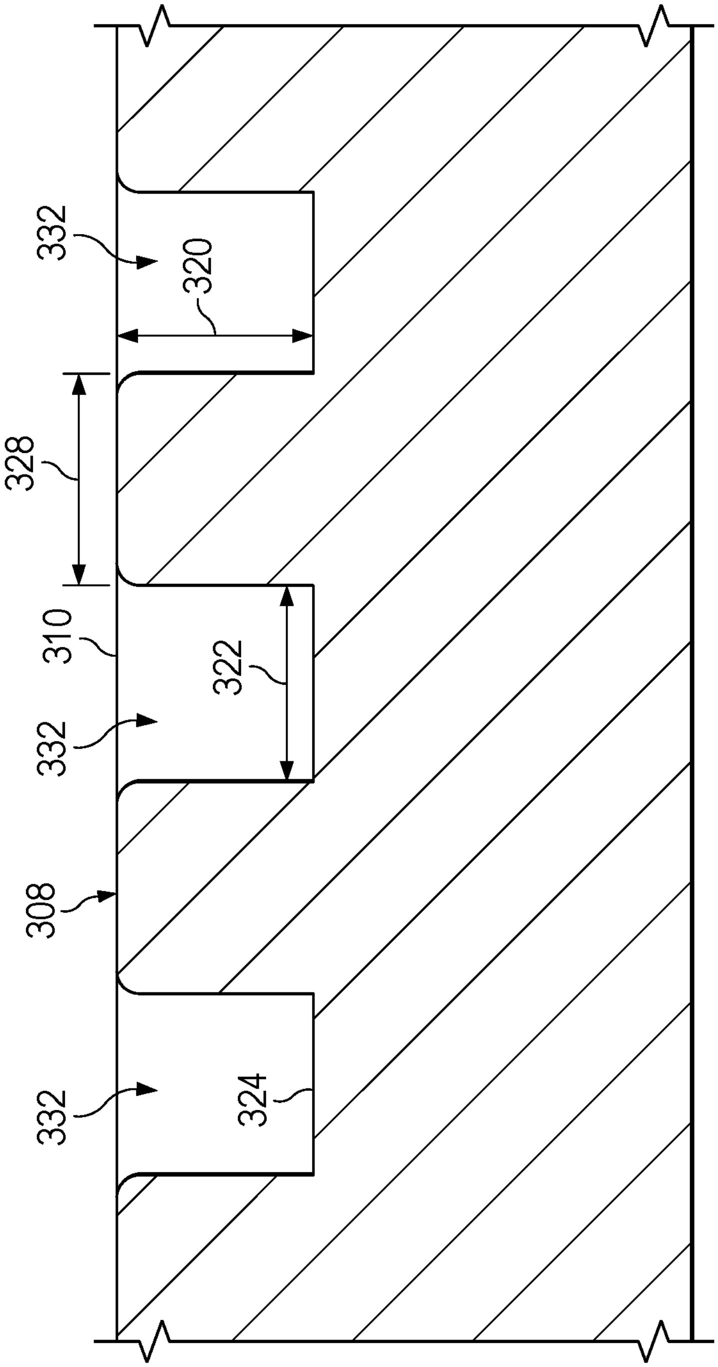
FIG. 10 is a cross-sectional view of a portion of the razor blade of FIG. 8A taken along the line 10-10 of FIG. 8B.
Figure 11A:
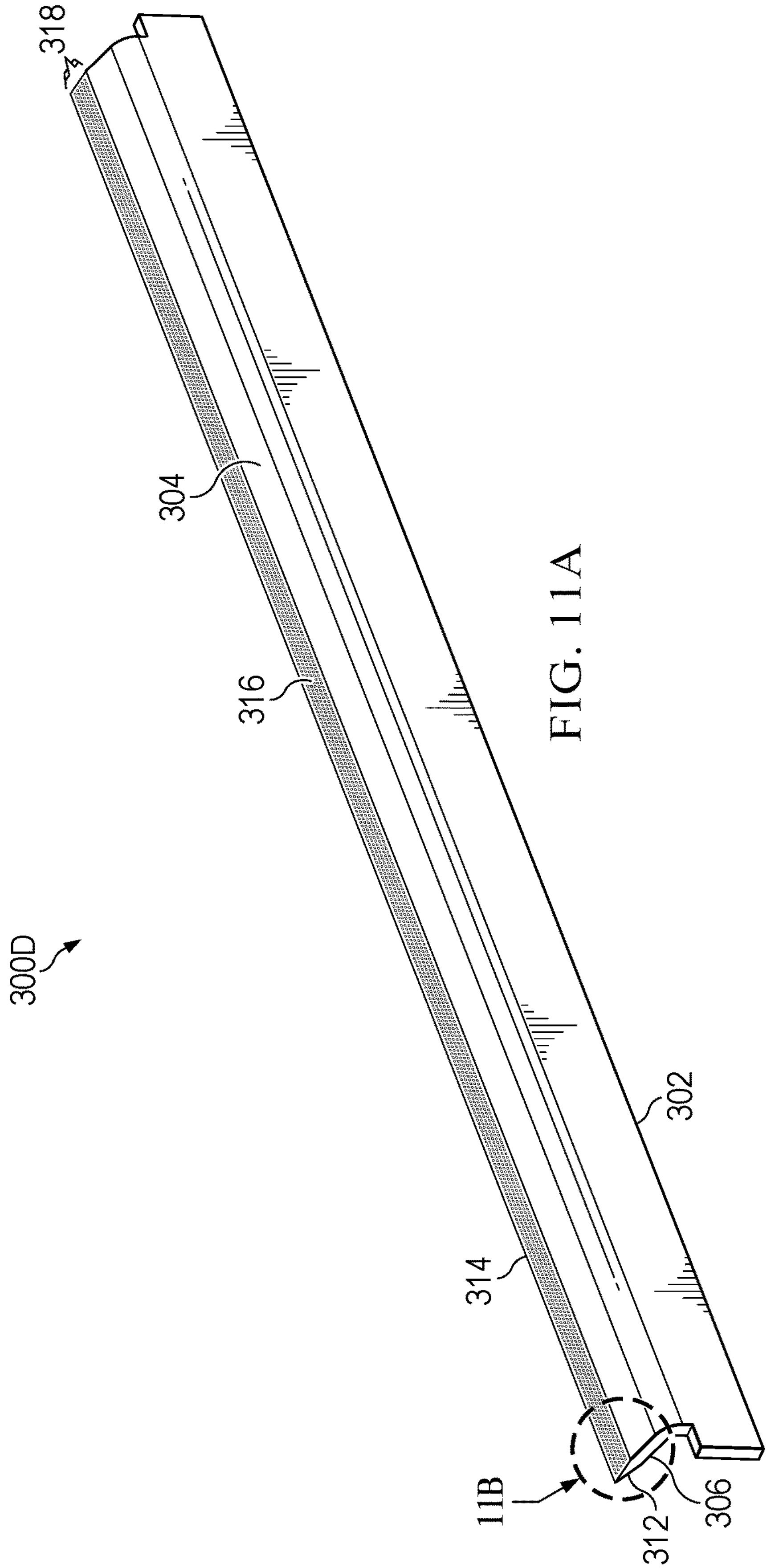
FIG. 11A is a top perspective view of a fourth example razor blade for use in the shaving razor of FIG. 1.
Figure 11B:
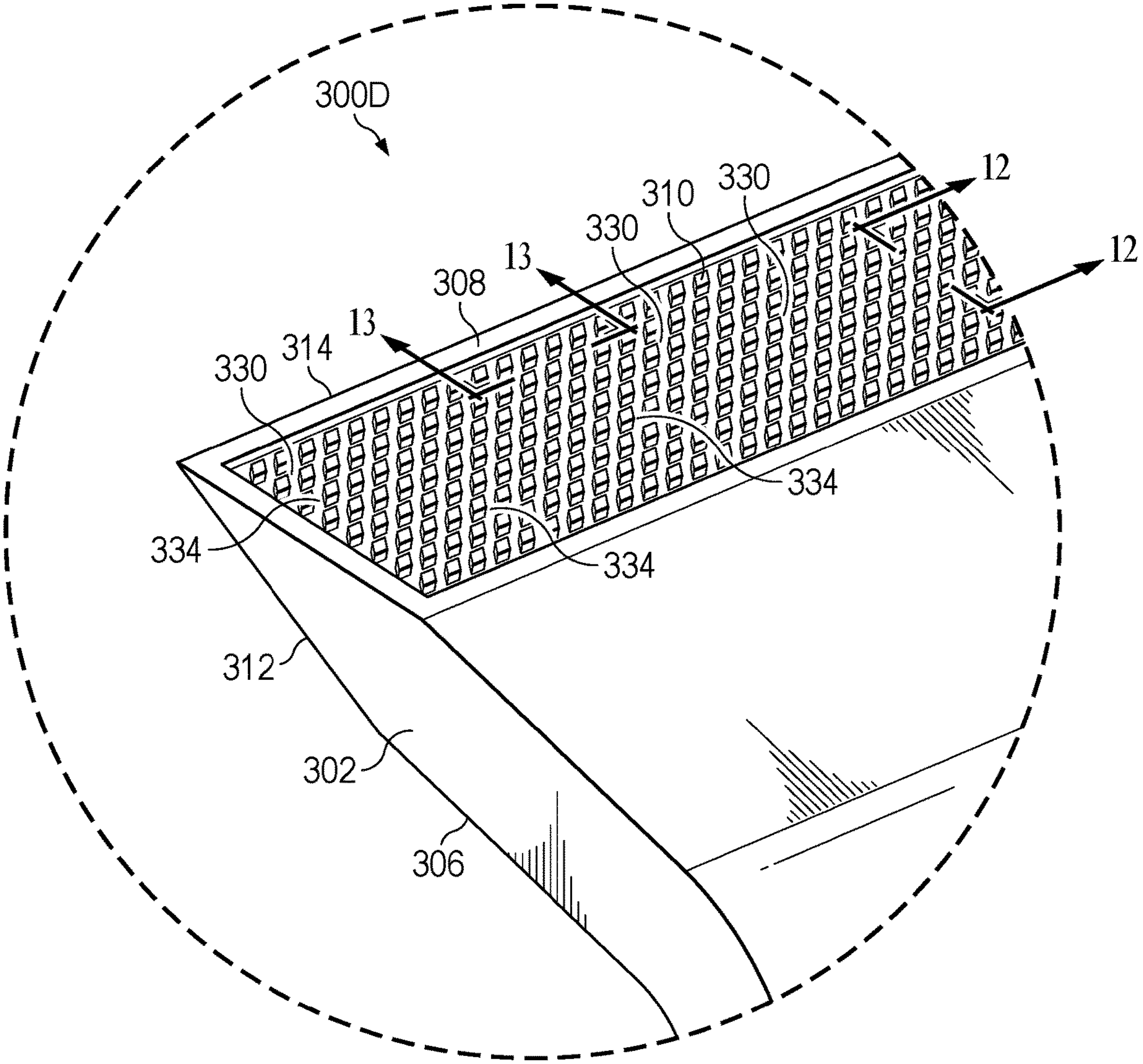
FIG. 11B is an enlarged view of a portion of the razor blade of FIG. 11A.
Figure 12:
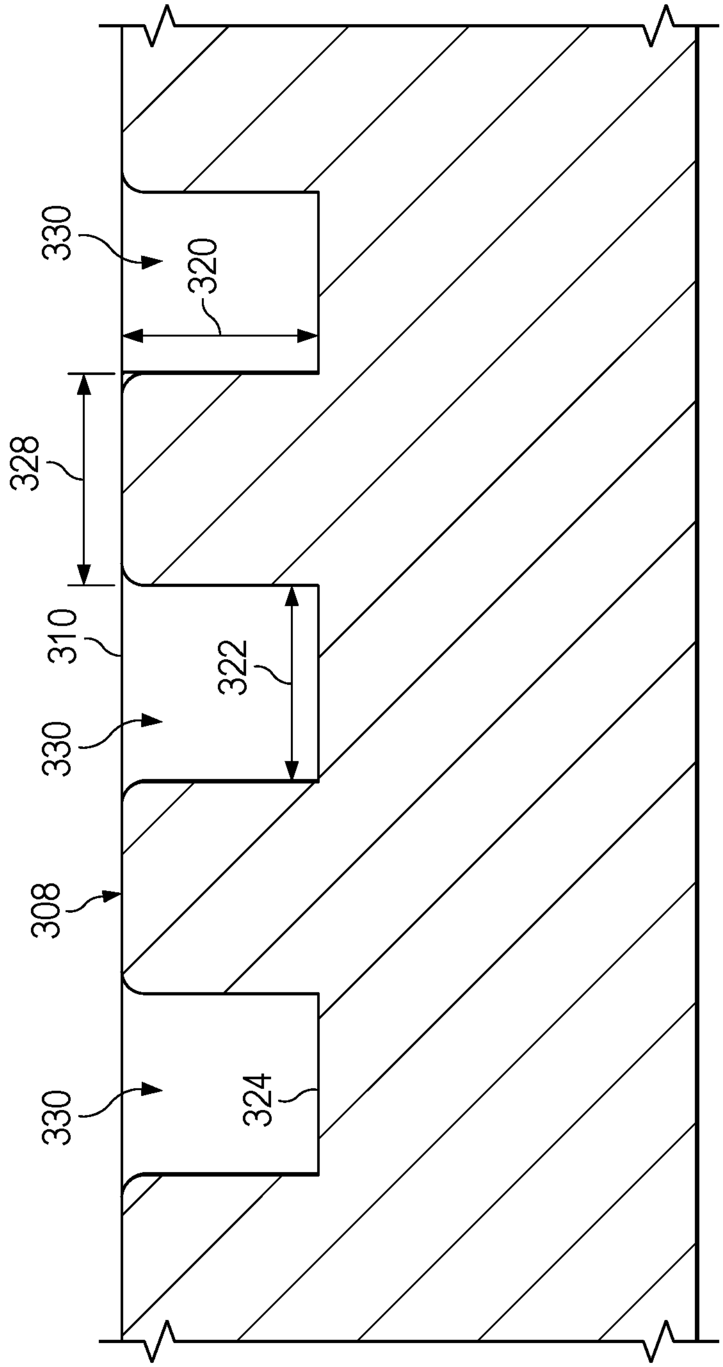
FIG. 12 is a cross-sectional view of a portion of the razor blade of FIG. 11A taken along the line 12-12 of FIG. 11B.
Figure 13:
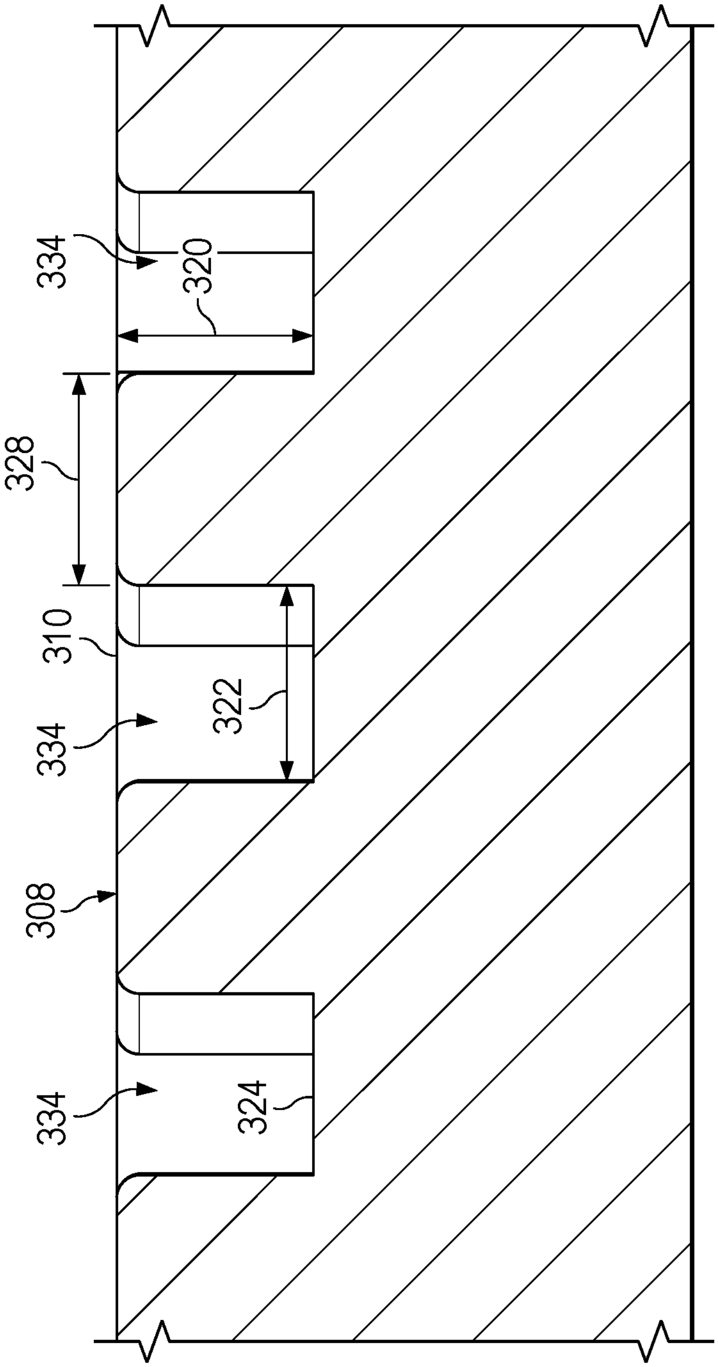
FIG. 13 is a cross-sectional view of a portion of the razor blade of FIG. 11A taken along the line 13-13 of FIG. 11B.

To manage the friction as razor blade(s) 300 passes over the skin of the user during shaving, a first facet 308 of razor blade(s) 300 could have a first textured surface 316 including a first plurality of elements 318 and/or a second facet 312 of razor blade(s) 300 could have a second textured surface 344 including a second plurality of elements 346. As described in more detail below, first plurality of elements 318 and/or second plurality of elements 346 could comprise a first plurality of grooves (see, e.g., FIGS. 3-4), a second plurality of grooves (see, e.g., FIGS. 5-7C), a combination of the first plurality of grooves and the second plurality of grooves (see, e.g., FIGS. 8-10), a combination of the first plurality of grooves and a third plurality of grooves (see, e.g., FIGS. 11-13), a plurality of dimples (see, e.g., FIGS. 14-15), a plurality of V shaped grooves (see, e.g., FIGS. 16-17), or a bio-inspired pattern (see, e.g., FIG. 18).

Razor blade(s) 300 can also have a conforming first coating that covers at least a cutting edge 314 of razor blade(s) 300, but could also cover first textured surface 316 and/or second textured surface 344. The conforming first coating could be a hard coating, a lubricous coating, or a hard coating and a lubricous coating.

Figure 3A:
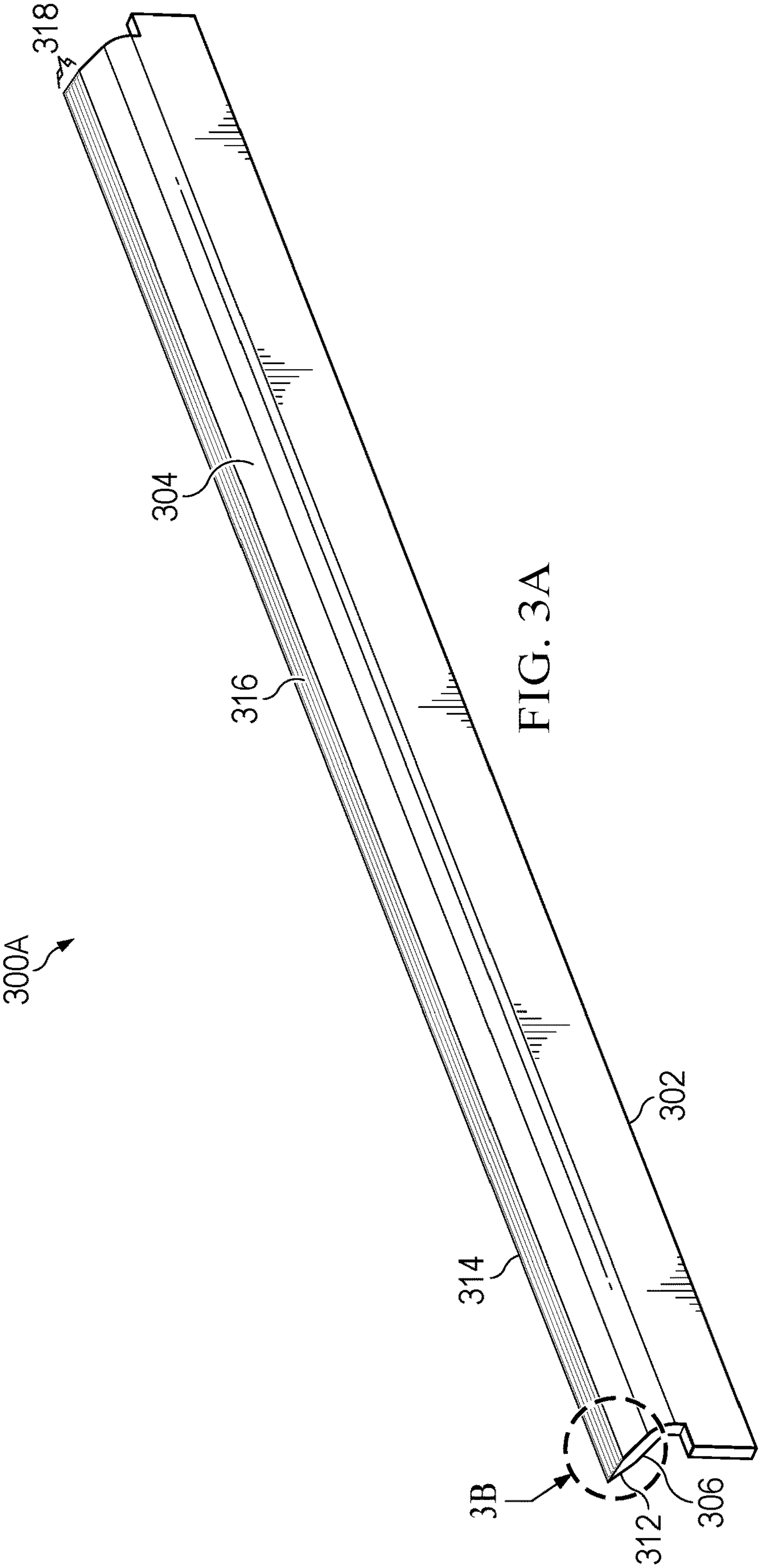
FIG. 3A is a top perspective view of a first example razor blade for use in the shaving razor of FIG. 1.
Figure 3B:
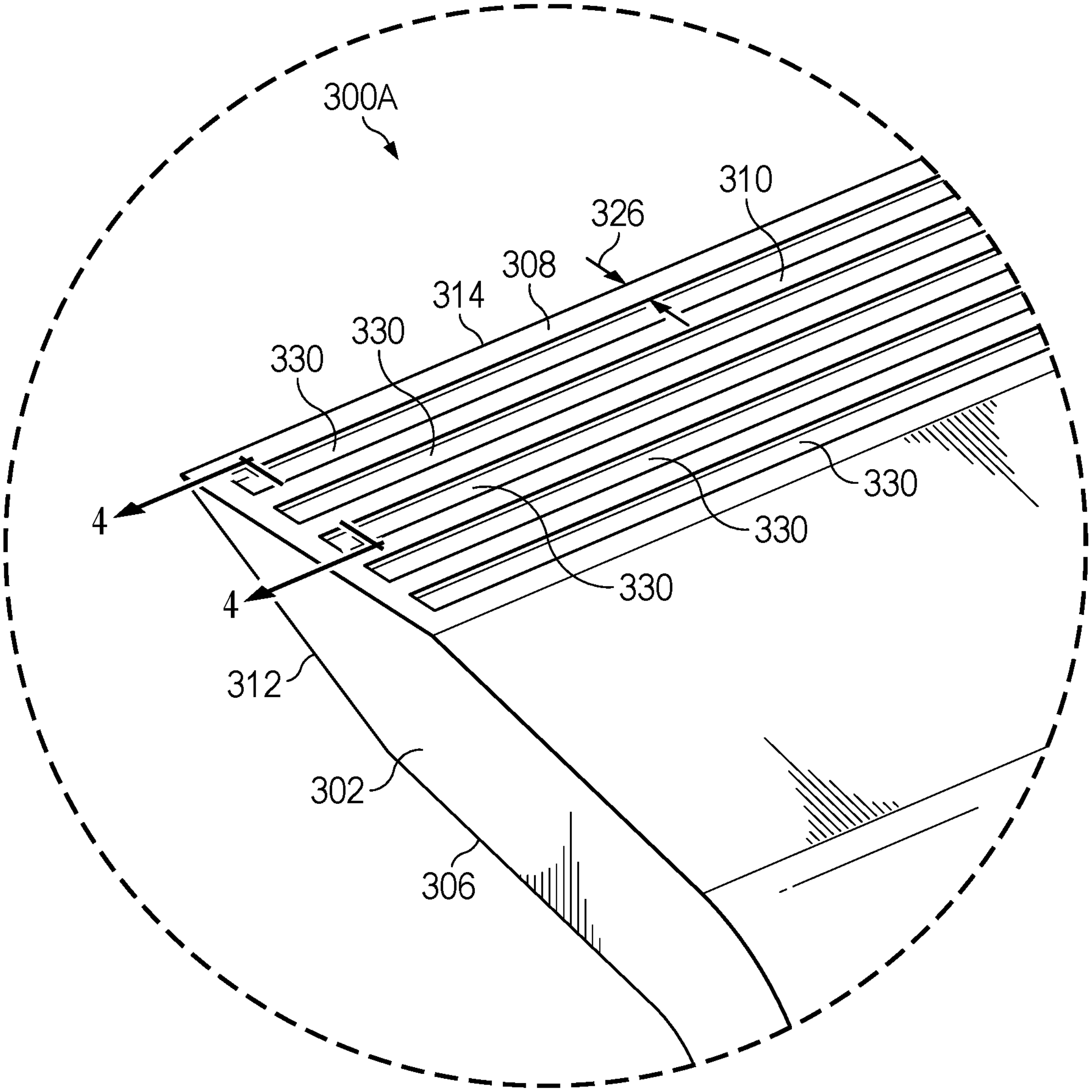
FIG. 3B is an enlarged view of a portion of the razor blade of FIG. 3A.
Figure 4:
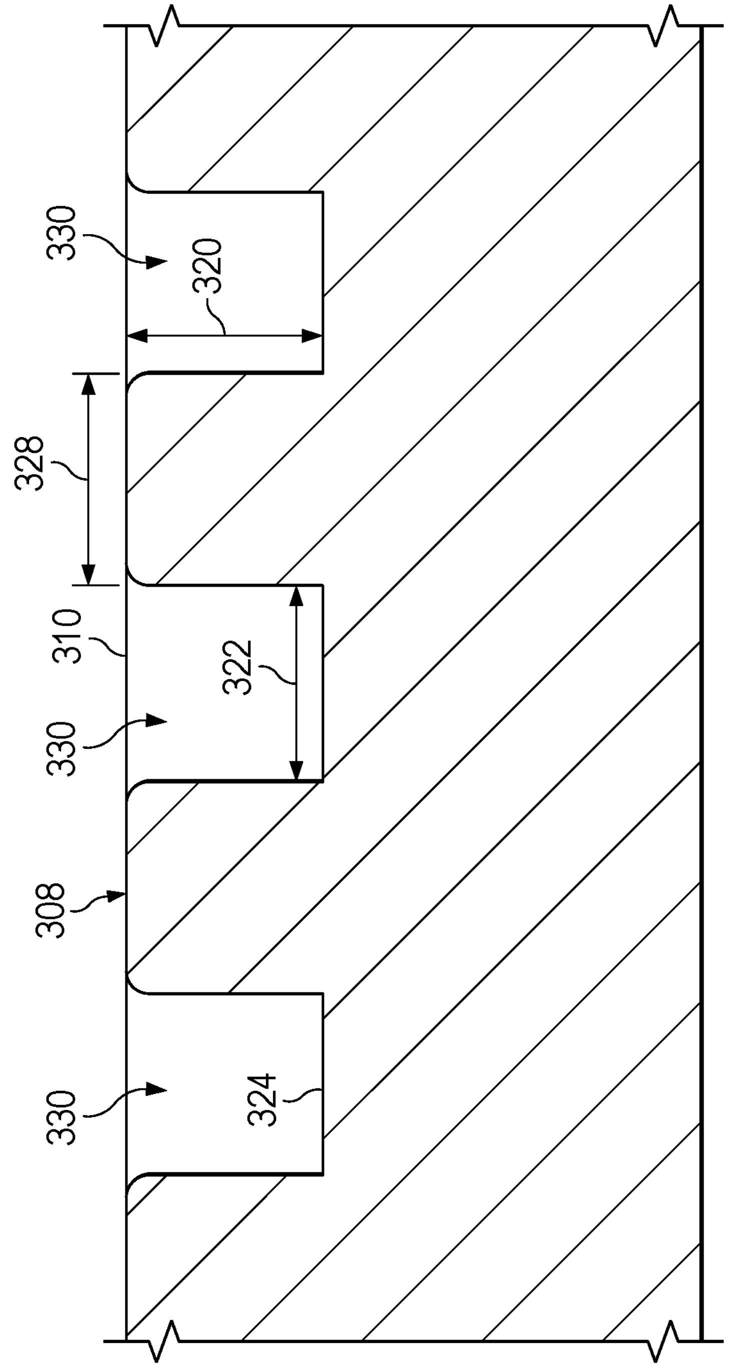
FIG. 4 is a cross-sectional view of a portion of the razor blade of FIG. 3A taken along the line 4-4 of FIG. 3B.

Referring to FIGS. 3A-4, a first example razor blade 300A is illustrated that can be used as razor blade 300 in shaving razor cartridge 104 of shaving razor 100. Razor blade 300A includes a substrate 302 having a first facet 308 formed on a first surface 304 of substrate 302 and a second facet 312 formed on a second surface 306 of substrate 302. First facet 308 and second facet 312 converge to define cutting edge 314 of razor blade 300A. A first textured surface 316 is formed on first facet 308, for example, by laser ablation. In one example, the laser ablation could be performed by an ultrashort pulse laser set at a power setting of 8 μJ and a wavelength of 1030 nm. The beam diameter used could be approximately 50% of the depth of the grooves being formed. Preferably, the laser pulse rate/duration, airflow, and atmosphere during the laser ablation are controlled to avoid "recast" being formed on the surfaces of the substrate around the features of the textured surfaces. Alternatively, secondary operations could be performed on the surfaces of the substrate around the features of the textured surfaces (e.g., machining, grinding, chemical etching, etc.) to reduce/remove any surface features developed by recasting.

First textured surface 316 is spaced apart from cutting edge 314 by a distance 326 of about 0.05 μm to about 2 μm and can extend about 2 μm to about 40 μm in a direction perpendicular to cutting edge 314. Distance 326, as used herein, is the distance between cutting edge 314 and the beginning or edge of first textured surface 316.

In razor blade 300A, first textured surface 316 includes a first plurality of elements 318, which include a first plurality of grooves 330 that extend into a top surface 310 of first facet 308 and extend longitudinally parallel to cutting edge 314. Preferably, the corners where the first plurality of grooves 330 converge with top surface 310 are radiused to avoid sharp corners. First plurality of grooves 330 can each have a depth 320 between about 0.01 μm and about 20 μm, preferably between about 0.01 μm and about 0.2 μm. Given a particular thickness of substrate 302 and the angles of first facet 308 and second facet 312, it is possible to select depth 320 to attempt to maximize the volume of lubrication/water that can be entrained in first plurality of grooves 330 while simultaneously minimizing structural weakening of razor blade 300A. Each of first plurality of grooves 330 can also have a width 322 of about 1 μm to about 50 μm, preferably about 10 μm to about 20 μm, and first plurality of grooves 330 can be spaced apart from each other by a distance 328 of about 1 μm to about 50 μm. Width 322 of each of first plurality of grooves 330 is preferably small enough that hair does not get trapped in or between first plurality of grooves 330.

It is believed, without being held to theory, that laser ablating the surface of a blade edge can influence friction and cutting force.

Figure 5A:
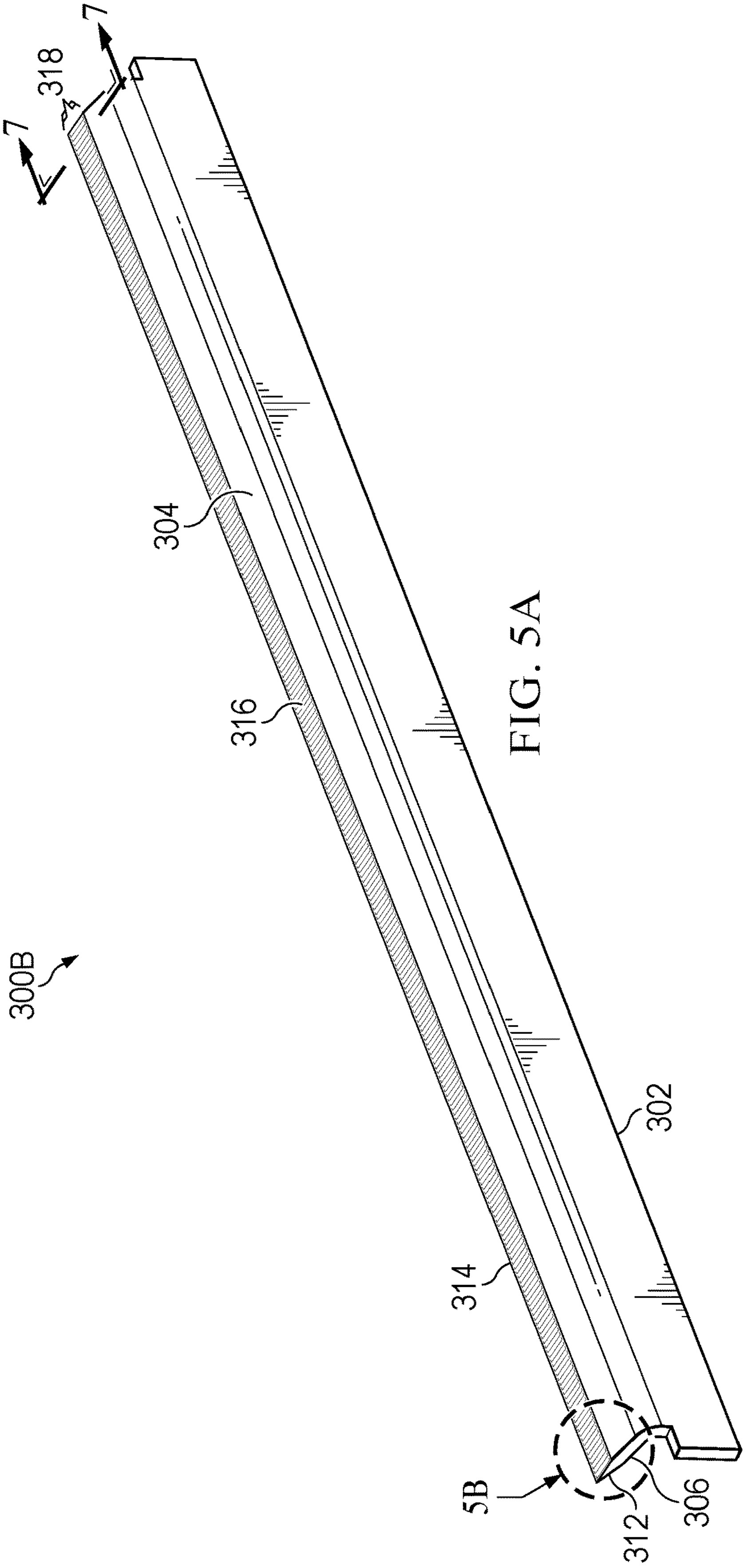
FIG. 5A is a top perspective view of a second example razor blade for use in the shaving razor of FIG. 1.
Figure 5B:
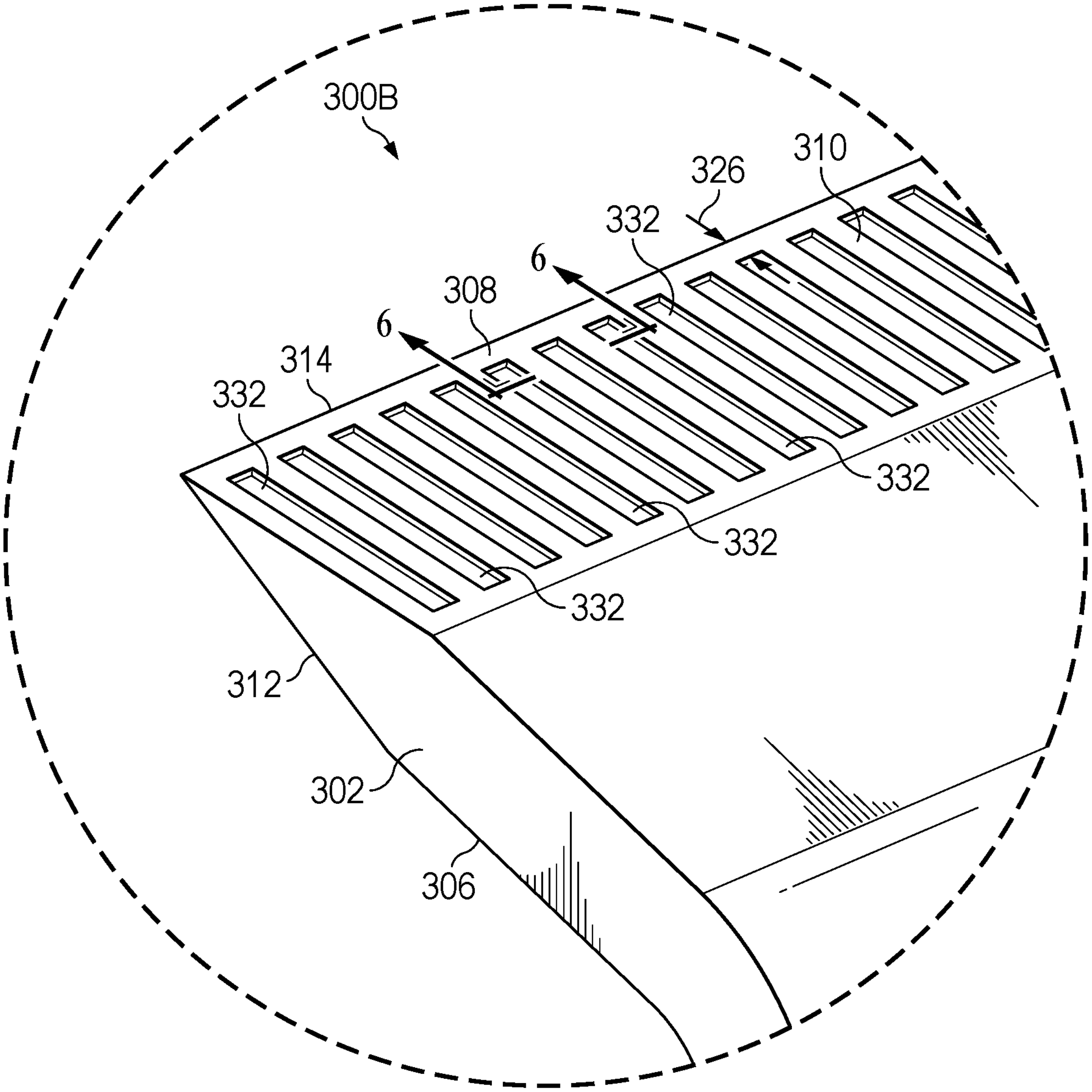
FIG. 5B is an enlarged view of a portion of the razor blade of FIG. 5A.
Figure 6:
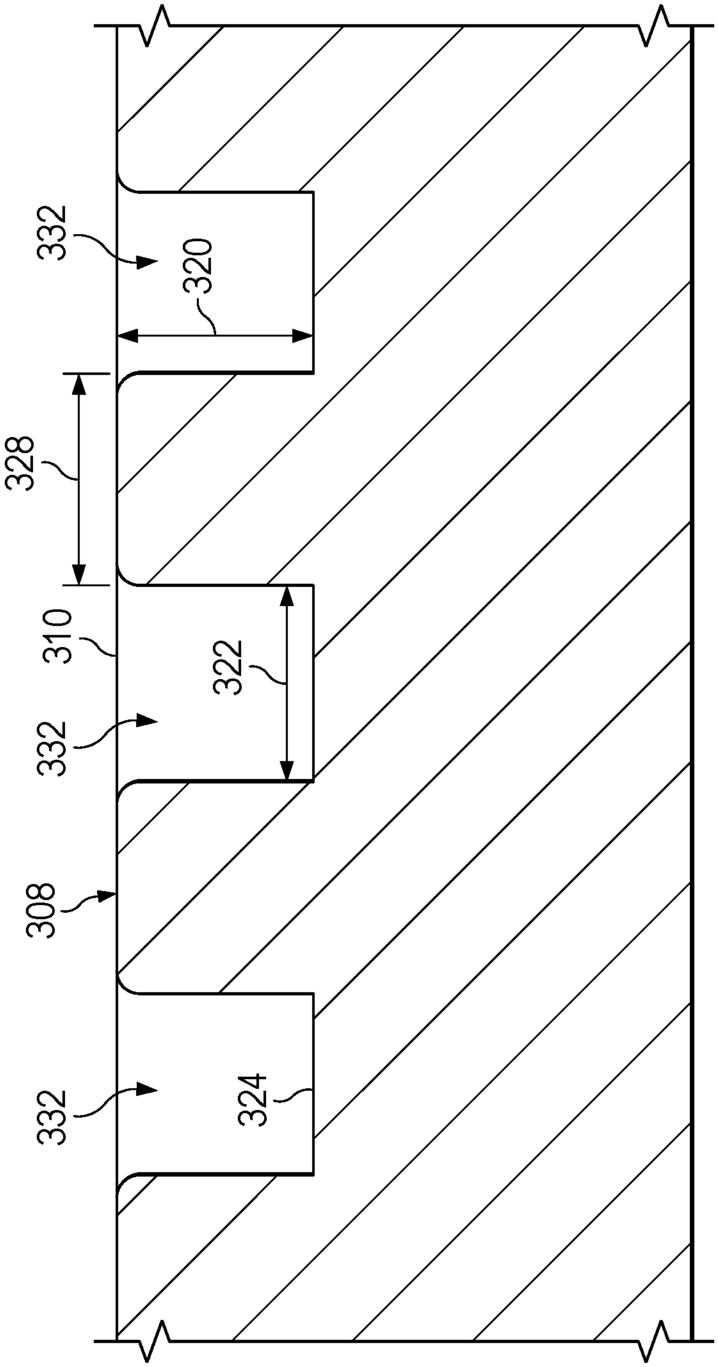
FIG. 6 is a cross-sectional view of a portion of the razor blade of FIG. 5A taken along the line 6-6 of FIG. 5B.

Referring to FIGS. 5A-6, a second example razor blade 300B is illustrated that can be used as razor blade 300 in shaving razor cartridge 104 of shaving razor 100. Razor blade 300B includes substrate 302 having first facet 308 formed on first surface 304 of substrate 302 and second facet 312 formed on second surface 306 of substrate 302. First facet 308 and second facet 312 converge to define cutting edge 314 of razor blade 300B. First textured surface 316 is formed on first facet 308, for example, by laser ablation. In one example, the laser ablation could be performed by an ultrashort pulse laser set at a power setting of 8 μJ and a wavelength of 1030 nm. The beam diameter used could be approximately 50% of the depth of the grooves being formed. Preferably, the laser pulse rate/duration, airflow, and atmosphere during the laser ablation are controlled to avoid "recast" being formed on the surfaces of the substrate around the features of the textured surfaces. Alternatively, secondary operations could be performed on the surfaces of the substrate around the features of the textured surfaces (e.g., machining, grinding, chemical etching, etc.) to reduce/remove any surface features developed by recasting.

First textured surface 316 is spaced apart from cutting edge 314 by a distance 326 of about 0.05 μm to about 2 μm and can extend about 2 μm to about 40 μm in a direction perpendicular to cutting edge 314. Distance 326, as used herein, is the distance between cutting edge 314 and the beginning or edge of first textured surface 316.

In razor blade 300B, first textured surface 316 includes a first plurality of elements 318, which include a second plurality of grooves 332 that extend into top surface 310 of first facet 308 and extend longitudinally perpendicular to cutting edge 314. Preferably, the corners where the second plurality of grooves 332 converge with top surface 310 are radiused to avoid sharp corners. Second plurality of grooves 332 can each have a depth 320 between about 0.01 μm and about 20 μm, preferably between about 0.01 μm and about 0.2 μm. Given a particular thickness of substrate 302 and the angles of first facet 308 and second facet 312, it is possible to select depth 320 to attempt to maximize the volume of lubrication/water that can be entrained in second plurality of grooves 332 while simultaneously minimizing structural weakening of razor blade 300B. Each of second plurality of grooves 332 can also have a width 322 of about 1 μm to about 50 μm, preferably about 10 μm to about 20 μm, and second plurality of grooves 332 can be spaced apart from each other by a distance 328 of about 1 μm to about 50 μm. Width 322 of each of second plurality of grooves 332 is preferably small enough that hair does not get trapped in or between second plurality of grooves 332.

Figure 7A:
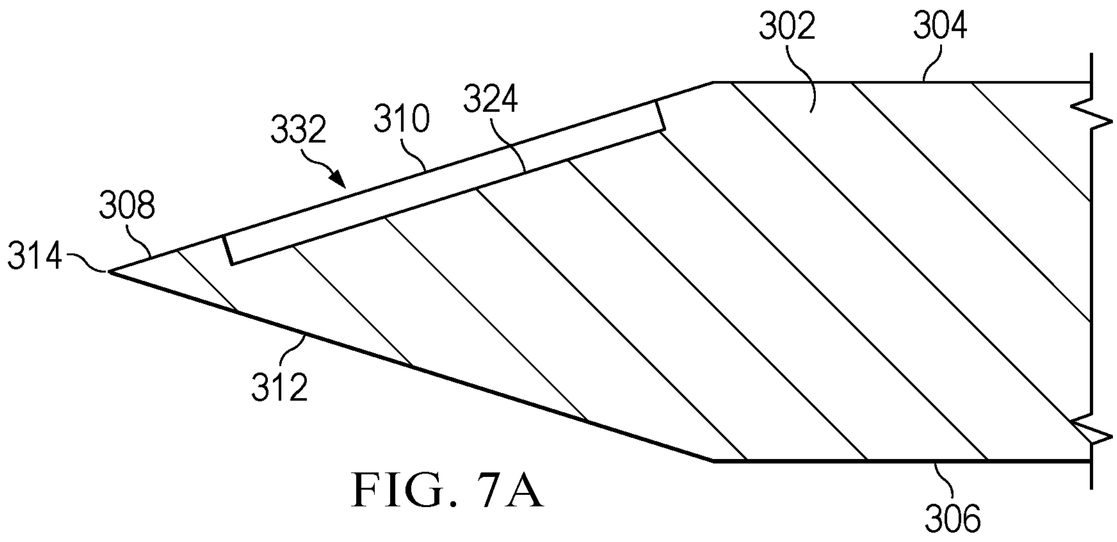
FIG. 7A is a cross-sectional view of a portion of the razor blade of FIG. 5A taken along the line 7-7 of FIG. 5A with a first example base surface.
Figure 7B:
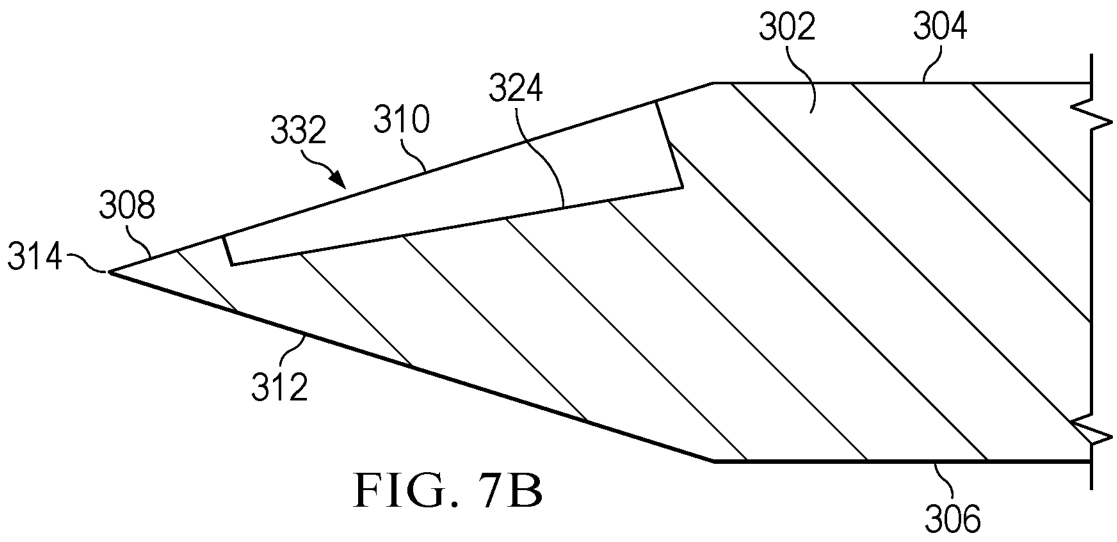
FIG. 7B is a cross-sectional view of a portion of the razor blade of FIG. 5A taken along the line 7-7 of FIG. 5A with a second example base surface.
Figure 7C:
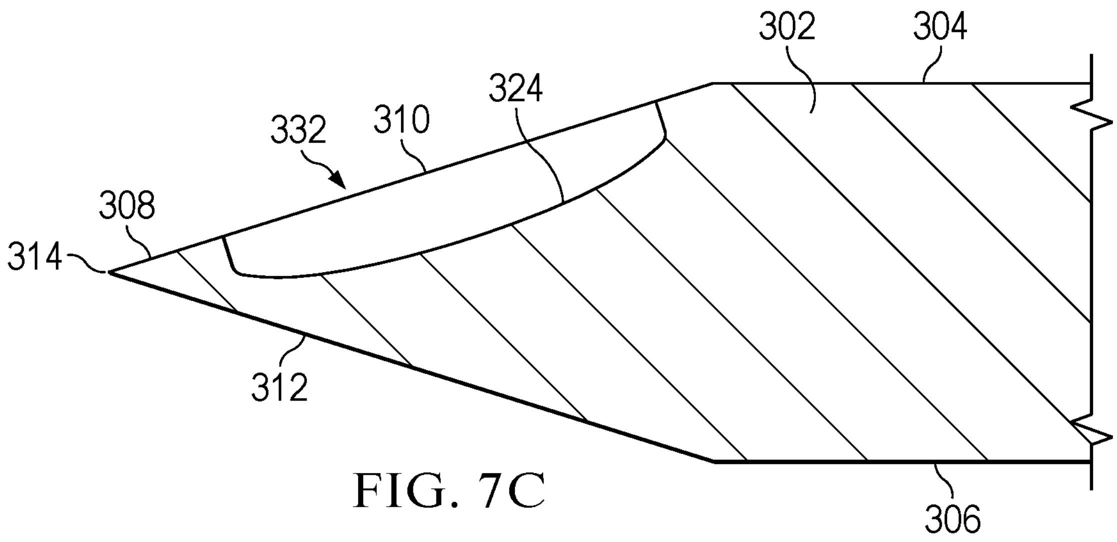
FIG. 7C is a cross-sectional view of a portion of the razor blade of FIG. 5A taken along the line 7-7 of FIG. 5A with a third example base surface.

As shown in FIGS. 7A-C, each of second plurality of grooves 332 can have a planar base surface 324 and a consistent depth 320 along the length of each of second plurality of grooves 332 (FIG. 7A), each of second plurality of grooves 332 can have an arcuate base surface 324 and an increasing and decreasing depth 320 along the length of each of second plurality of grooves 332 (FIG. 7C), or each of second plurality of grooves 332 can have a planar or arcuate base surface 324 and depth 320 can increase with increasing distance from cutting edge 314 (FIG. 7B).

It is believed, without being held to theory, that laser ablating the surface of a blade edge can influence friction and cutting force.

Referring to FIGS. 8A-10, a third example razor blade 300C is illustrated that can be used as razor blade 300 in shaving razor cartridge 104 of shaving razor 100. Razor blade 300C includes substrate 302 having first facet 308 formed on first surface 304 of substrate 302 and second facet 312 formed on second surface 306 of substrate 302. First facet 308 and second facet 312 converge to define cutting edge 314 of razor blade 300C. First textured surface 316 is formed on first facet 308, for example, by laser ablation. In one example, the laser ablation could be performed by an ultrashort pulse laser set at a power setting of 8 μJ and a wavelength of 1030 nm. The beam diameter used could be approximately 50% of the depth of the grooves being formed. Preferably, the laser pulse rate/duration, airflow, and atmosphere during the laser ablation are controlled to avoid "recast" being formed on the surfaces of the substrate around the features of the textured surfaces. Alternatively, secondary operations could be performed on the surfaces of the substrate around the features of the textured surfaces (e.g., machining, grinding, chemical etching, etc.) to reduce/remove any surface features developed by recasting.

First textured surface 316 is spaced apart from cutting edge 314 by a distance 326 of about 0.05 μm to about 2 μm and can extend about 2 μm to about 40 μm in a direction perpendicular to cutting edge 314. Distance 326, as used herein, is the distance between cutting edge 314 and the beginning or edge of first textured surface 316.

In razor blade 300C, first textured surface 316 includes a first plurality of elements 318, which include first plurality of grooves 330 that extend into a top surface 310 of first facet 308 and extend longitudinally parallel to cutting edge 314 and second plurality of grooves 332 that extend into top surface 310 of first facet 308 and extend longitudinally perpendicular to cutting edge 314 and to first plurality of grooves 330 (forming a plurality of "rectangular columns"). Preferably, the corners where first plurality of grooves 330 and second plurality of grooves 332 converge with top surface 310 are radiused to avoid sharp corners. First plurality of grooves 330 and second plurality of grooves 332 can each have a depth 320 between about 0.01 μm and about 20 μm, preferably between about 0.01 μm and about 0.2 μm. Given a particular thickness of substrate 302 and the angles of first facet 308 and second facet 312, it is possible to select depth 320 to attempt to maximize the volume of lubrication/water that can be entrained in first plurality of grooves 330 and second plurality of grooves 332 while simultaneously minimizing structural weakening of razor blade 300C. Each of first plurality of grooves 330 and second plurality of grooves 332 can also have a width 322 of about 1 μm to about 50 μm, preferably about 10 μm to about 20 μm. First plurality of grooves 330 can be spaced apart from each other by a distance 328 of about 1 μm to about 50 μm and second plurality of grooves 332 can be spaced apart from each other by a distance 328 of about 1 μm to about 50 μm. Width 322 of each of first plurality of grooves 330 and second plurality of grooves 332 is preferably small enough that hair does not get trapped in or between first plurality of grooves 330 or second plurality of grooves 332.

It is believed, without being held to theory, that laser ablating the surface of a blade edge can influence friction and cutting force.

Referring to FIGS. 11A-13, a fourth example razor blade 300D is illustrated that can be used as razor blade 300 in shaving razor cartridge 104 of shaving razor 100. Razor blade 300D includes substrate 302 having first facet 308 formed on first surface 304 of substrate 302 and second facet 312 formed on second surface 306 of substrate 302. First facet 308 and second facet 312 converge to define cutting edge 314 of razor blade 300D. First textured surface 316 is formed on first facet 308, for example, by laser ablation. In one example, the laser ablation could be performed by an ultrashort pulse laser set at a power setting of 8 μJ and a wavelength of 1030 nm. The beam diameter used could be approximately 50% of the depth of the grooves being formed. Preferably, the laser pulse rate/duration, airflow, and atmosphere during the laser ablation are controlled to avoid "recast" being formed on the surfaces of the substrate around the features of the textured surfaces. Alternatively, secondary operations could be performed on the surfaces of the substrate around the features of the textured surfaces (e.g., machining, grinding, chemical etching, etc.) to reduce/remove any surface features developed by recasting.

First textured surface 316 is spaced apart from cutting edge 314 by a distance 326 of about 0.05 μm to about 2 μm and can extend about 2 μm to about 40 μm in a direction perpendicular to cutting edge 314. Distance 326, as used herein, is the distance between cutting edge 314 and the beginning or edge of first textured surface 316.

In razor blade 300D, first textured surface 316 includes a first plurality of elements 318, which include first plurality of grooves 330 that extend into a top surface 310 of first facet 308 and extend longitudinally parallel to cutting edge 314 and a third plurality of grooves 334 that extend into top surface 310 of first facet 308 and extend longitudinally at an angle of about 20 degrees to about 70 degrees, in one embodiment 60 degrees, relative to cutting edge 314 and to first plurality of grooves 330 (forming a plurality of "angled columns"). Preferably, the corners where first plurality of grooves 330 and third plurality of grooves 334 converge with top surface 310 are radiused to avoid sharp corners. First plurality of grooves 330 and third plurality of grooves 334 can each have a depth 320 between about 0.01 μm and about 20 μm, preferably between about 0.01 μm and about 0.2 μm. Given a particular thickness of substrate 302 and the angles of first facet 308 and second facet 312, it is possible to select depth 320 to attempt to maximize the volume of lubrication/water that can be entrained in first plurality of grooves 330 and third plurality of grooves 334 while simultaneously minimizing structural weakening of razor blade 300D. Each of first plurality of grooves 330 and third plurality of grooves 334 can also have a width 322 of about 1 μm to about 50 μm, preferably about 10 μm to about 20 μm. First plurality of grooves 330 can be spaced apart from each other by a distance 328 of about 1 μm to about 50 μm and third plurality of grooves 334 can be spaced apart from each other by a distance 328 of about 1 μm to about 50 μm. Width 322 of each of first plurality of grooves 330 and third plurality of grooves 334 is preferably small enough that hair does not get trapped in or between first plurality of grooves 330 or third plurality of grooves 334.

It is believed, without being held to theory, that laser ablating the surface of a blade edge can influence friction and cutting force.

Figure 14A:
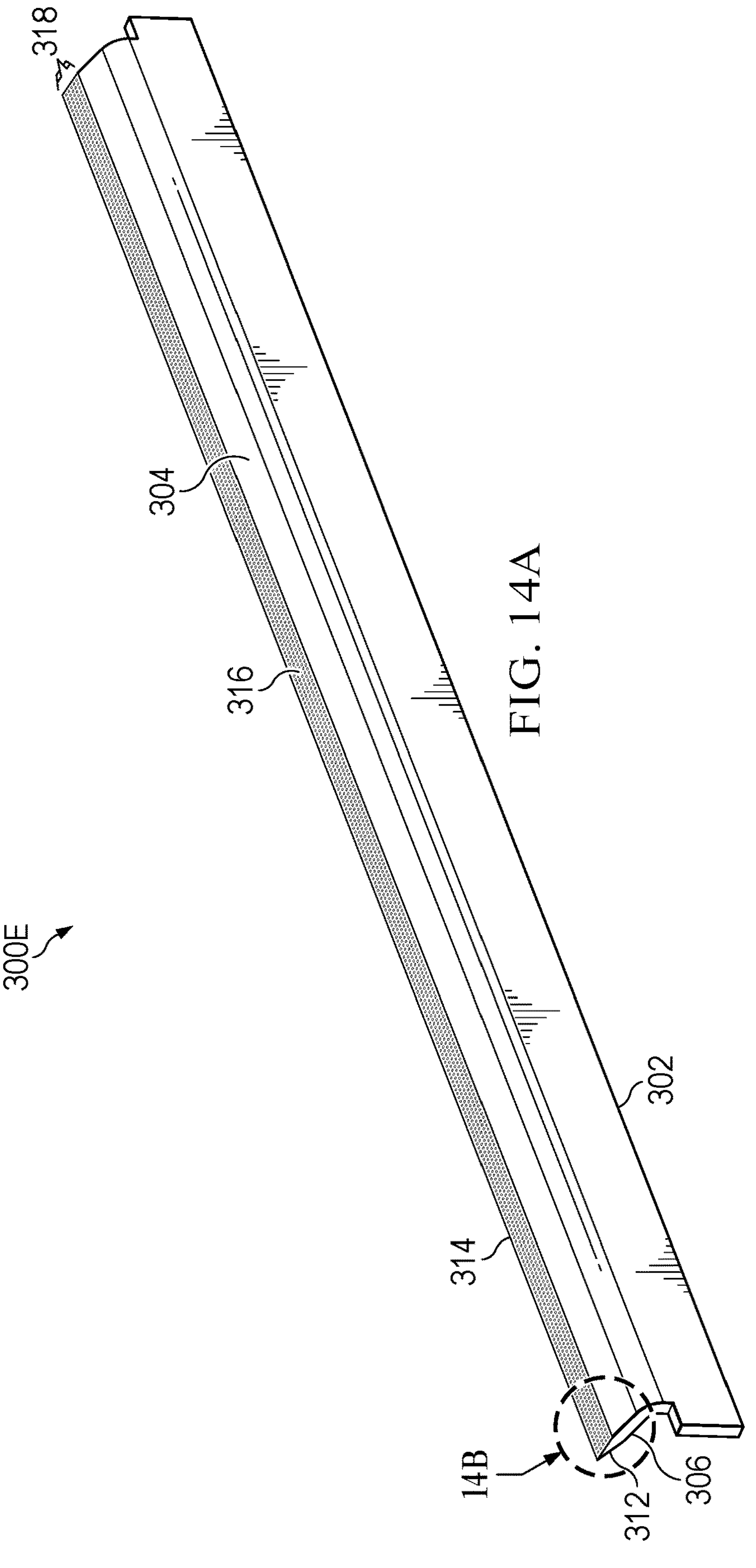
FIG. 14A is a top perspective view of a fifth example razor blade for use in the shaving razor of FIG. 1.
Figure 14B:
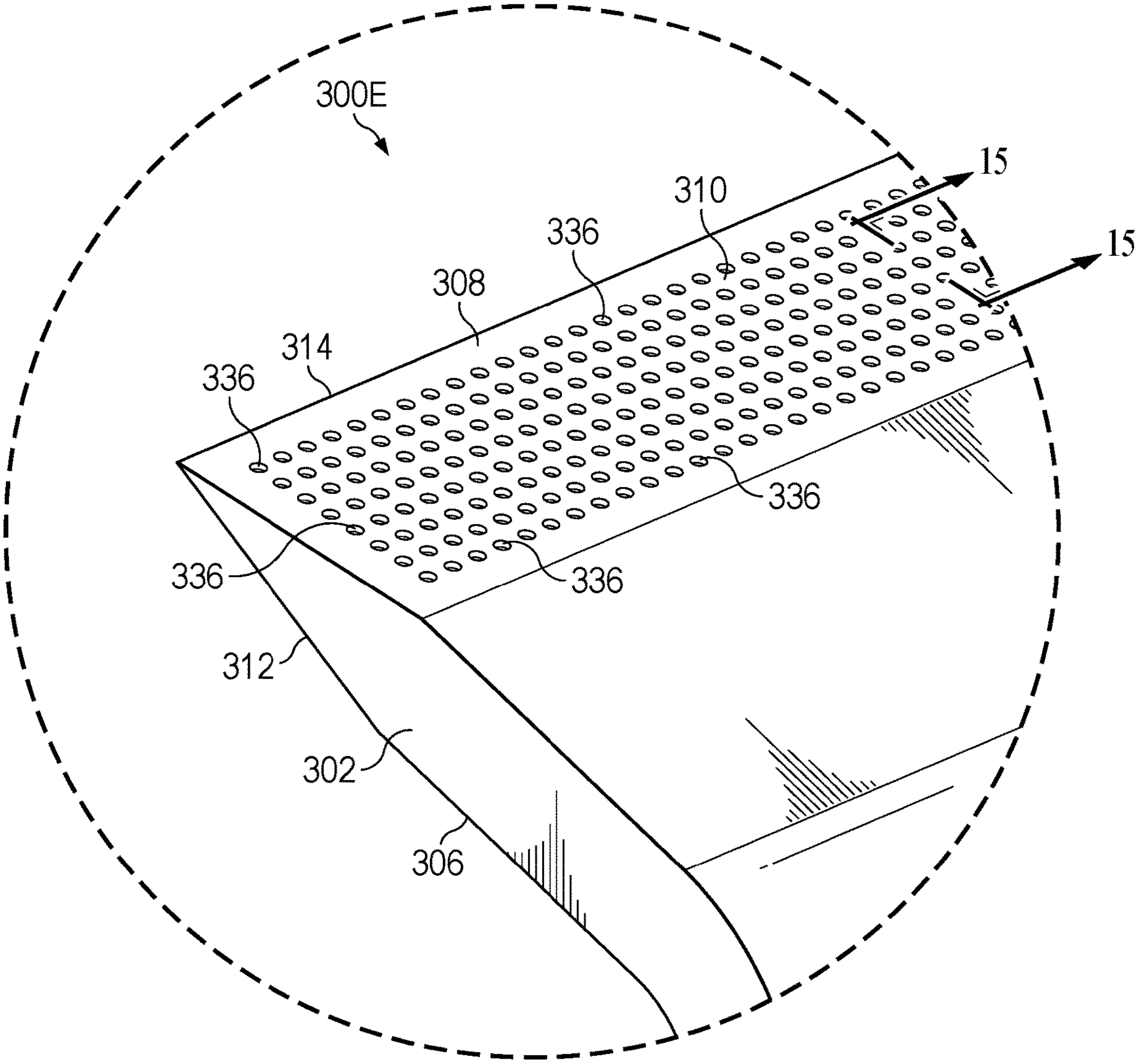
FIG. 14B is an enlarged view of a portion of the razor blade of FIG. 14A.
Figure 15:
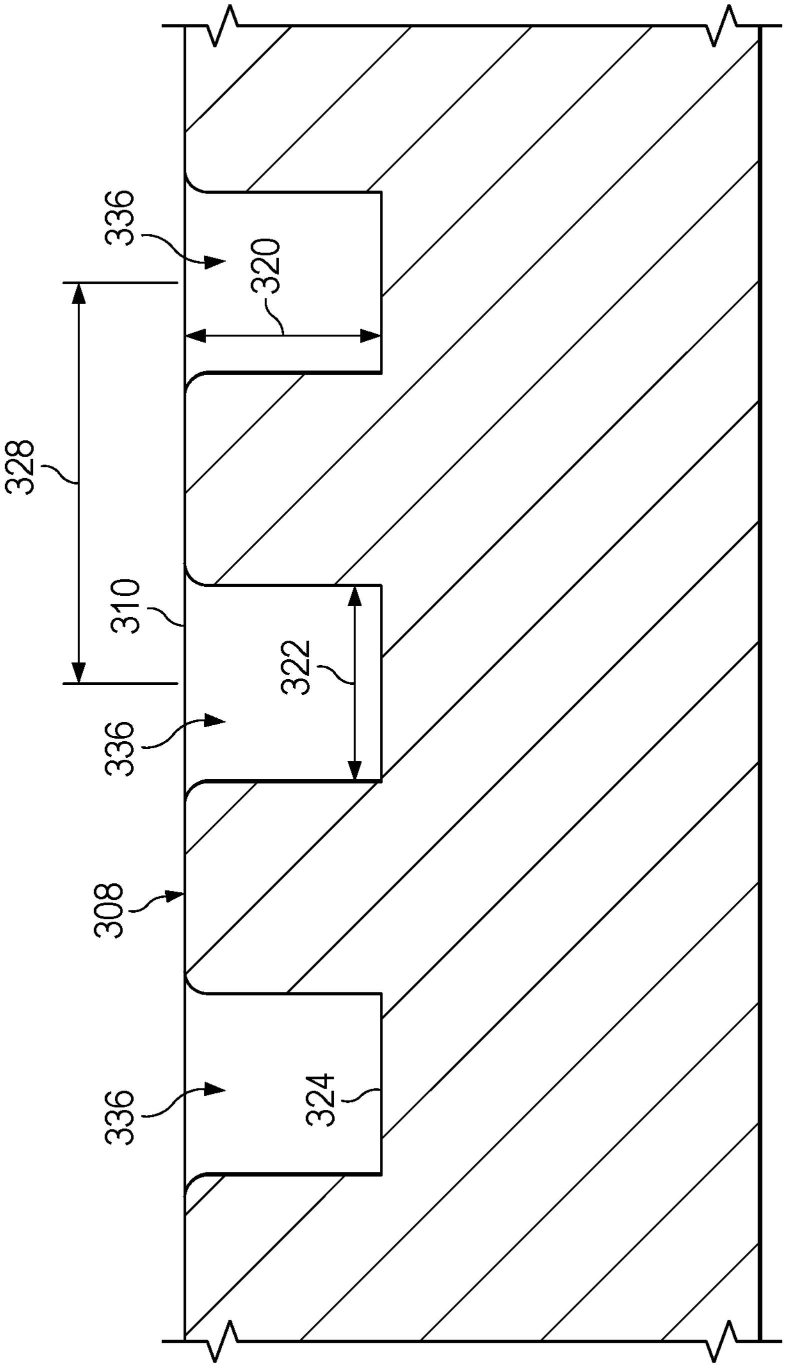
FIG. 15 is a cross-sectional view of a portion of the razor blade of FIG. 14A taken along the line 15-15 of FIG. 14B.

Referring to FIGS. 14A-15, a fifth example razor blade 300E is illustrated that can be used as razor blade 300 in shaving razor cartridge 104 of shaving razor 100. Razor blade 300E includes substrate 302 having first facet 308 formed on first surface 304 of substrate 302 and second facet 312 formed on second surface 306 of substrate 302. First facet 308 and second facet 312 converge to define cutting edge 314 of razor blade 300E. First textured surface 316 is formed on first facet 308, for example, by laser ablation. In one example, the laser ablation could be performed by an ultrashort pulse laser set at a power setting of 8 μJ and a wavelength of 1030 nm. The beam diameter used could be approximately 50% of the depth of the grooves being formed. Preferably, the laser pulse rate/duration, airflow, and atmosphere during the laser ablation are controlled to avoid "recast" being formed on the surfaces of the substrate around the features of the textured surfaces. Alternatively, secondary operations could be performed on the surfaces of the substrate around the features of the textured surfaces (e.g., machining, grinding, chemical etching, etc.) to reduce/remove any surface features developed by recasting.

First textured surface 316 is spaced apart from cutting edge 314 by a distance 326 of about 0.05 μm to about 2 μm and can extend about 2 μm to about 40 μm in a direction perpendicular to cutting edge 314. Distance 326, as used herein, is the distance between cutting edge 314 and the beginning or edge of first textured surface 316.

In razor blade 300E, first textured surface 316 includes a first plurality of elements 318, which include a plurality of dimples 336 that extend into a top surface 310 of first facet 308. Preferably, the corners where plurality of dimples 336 converge with top surface 310 are radiused to avoid sharp corners. Plurality of dimples 336 can each have a depth 320 between about 0.01 μm and about 20 μm, preferably between about 0.01 μm and about 0.2 μm. Given a particular thickness of substrate 302 and the angles of first facet 308 and second facet 312, it is possible to select depth 320 to attempt to maximize the volume of lubrication/water that can be entrained in plurality of dimples 336 while simultaneously minimizing structural weakening of razor blade 300E. Each of plurality of dimples 336 can also have a circular or oval shape, or any other shape appropriate for a given application, at top surface 310 and a width 322 of about 1 μm to about 50 μm, preferably about 10 μm to about 20 μm. Plurality of dimples 336 can be spaced apart from each other by a distance 328 of about 1 μm to about 50 μm (measured center-to-center). Width 322 of each of plurality of dimples 336 is preferably small enough that hair does not get trapped in or between plurality of dimples 336.

It is believed, without being held to theory, that laser ablating the surface of a blade edge can influence friction and cutting force.

Figure 16A:
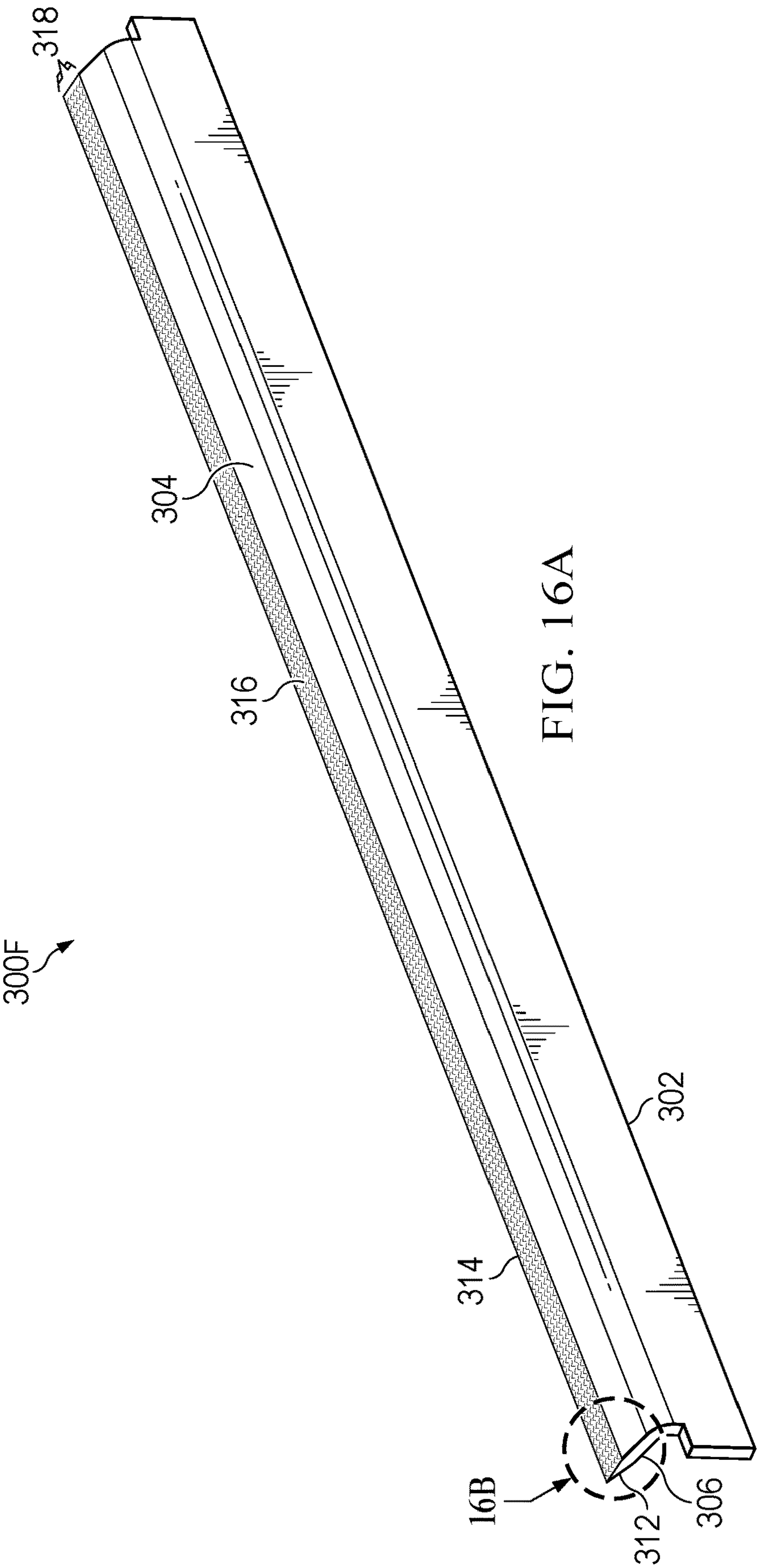
FIG. 16A is a top perspective view of a sixth example razor blade for use in the shaving razor of FIG. 1.
Figure 16B:
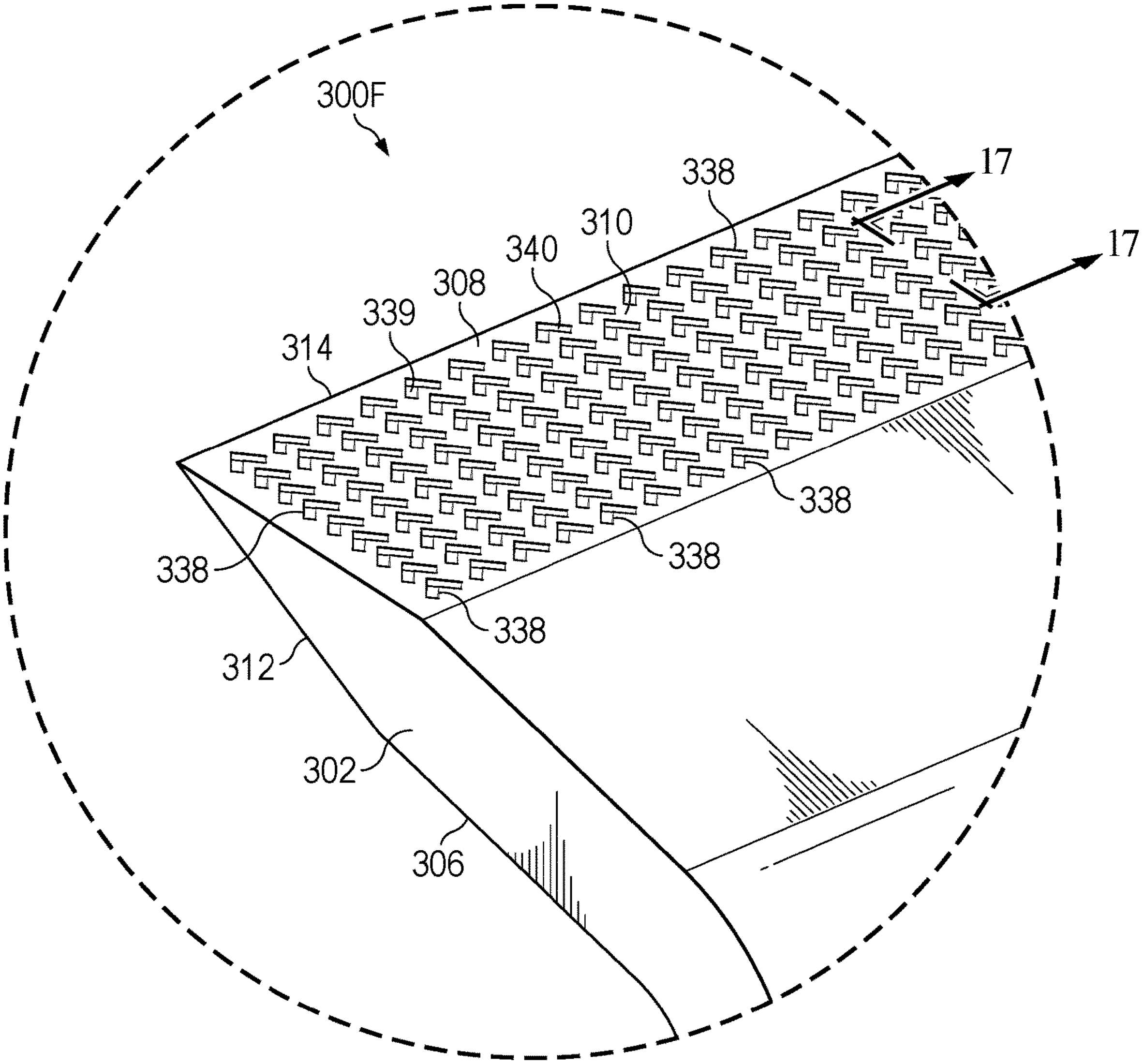
FIG. 16B is an enlarged view of a portion of the razor blade of FIG. 16A.
Figure 17:
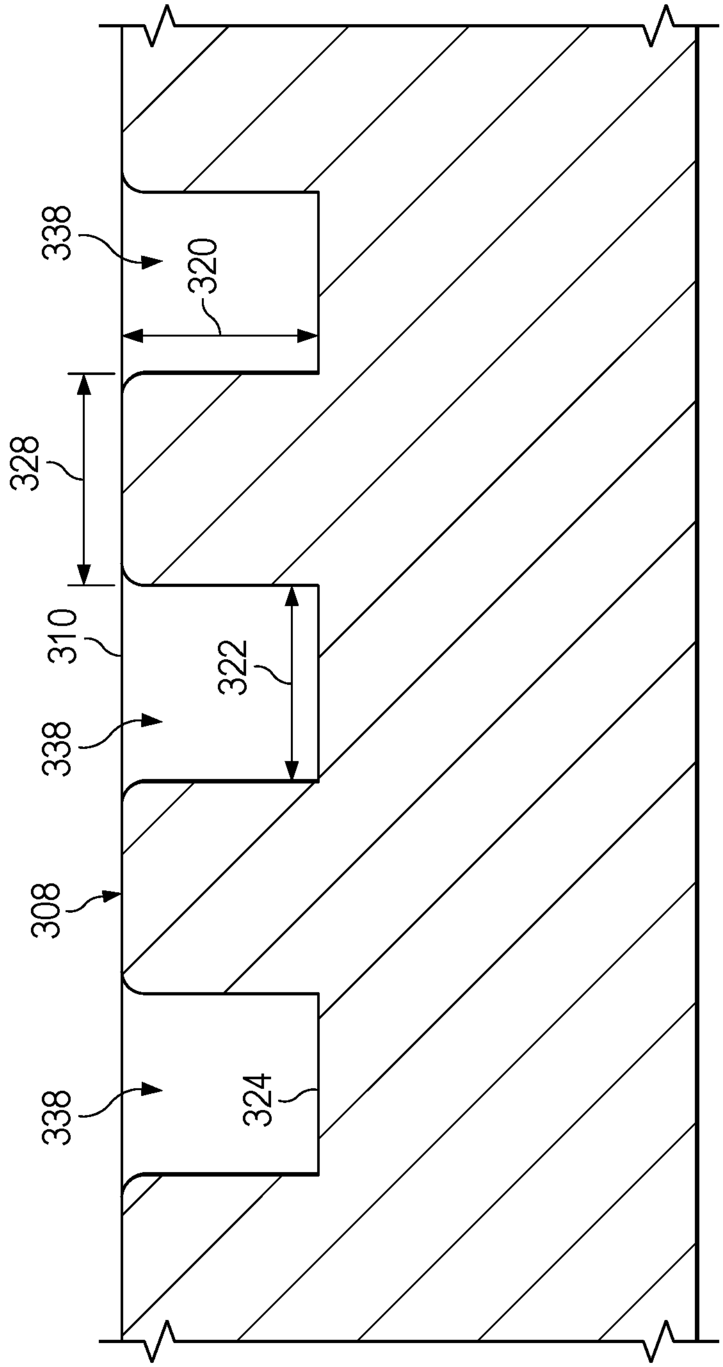
FIG. 17 is a cross-sectional view of a portion of the razor blade of FIG. 16A taken along the line 17-17 of FIG. 16B.

Referring to FIGS. 16A-17, a sixth example razor blade 300F is illustrated that can be used as razor blade 300 in shaving razor cartridge 104 of shaving razor 100. Razor blade 300F includes substrate 302 having first facet 308 formed on first surface 304 of substrate 302 and second facet 312 formed on second surface 306 of substrate 302. First facet 308 and second facet 312 converge to define cutting edge 314 of razor blade 300F. First textured surface 316 is formed on first facet 308, for example, by laser ablation. In one example, the laser ablation could be performed by an ultrashort pulse laser set at a power setting of 8 μJ and a wavelength of 1030 nm. The beam diameter used could be approximately 50% of the depth of the grooves being formed. Preferably, the laser pulse rate/duration, airflow, and atmosphere during the laser ablation are controlled to avoid "recast" being formed on the surfaces of the substrate around the features of the textured surfaces. Alternatively, secondary operations could be performed on the surfaces of the substrate around the features of the textured surfaces (e.g., machining, grinding, chemical etching, etc.) to reduce/remove any surface features developed by recasting.

First textured surface 316 is spaced apart from cutting edge 314 by a distance 326 of about 0.05 μm to about 2 μm and can extend about 2 μm to about 40 μm in a direction perpendicular to cutting edge 314. Distance 326, as used herein, is the distance between cutting edge 314 and the beginning or edge of first textured surface 316.

In razor blade 300F, first textured surface 316 includes a first plurality of elements 318, which include a plurality of V shaped grooves 338 that extend into a top surface 310 of first facet 308. Preferably, the corners where plurality of V shaped grooves 338 converge with top surface 310 are radiused to avoid sharp corners. Plurality of V shaped grooves 338 each have a V or chevron shape at top surface 310 and include a generally linear first groove portion 339 and a generally linear second groove portion 340 that is oriented longitudinally at an angle to first groove portion 339 to form the V or chevron shape. The "point" of the V or chevron shape (i.e., where first groove portion 339 and second groove portion 340 intersect) can be oriented toward or away from cutting edge 314. Plurality of V shaped grooves 338 can each have a depth 320 between about 0.01 μm and about 20 μm, preferably between about 0.01 μm and about 0.2 μm. Given a particular thickness of substrate 302 and the angles of first facet 308 and second facet 312, it is possible to select depth 320 to attempt to maximize the volume of lubrication/water that can be entrained in plurality of V shaped grooves 338 while simultaneously minimizing structural weakening of razor blade 300F. Each of plurality of V shaped grooves 338 can also have a width 322 of about 1 μm to about 50 μm, preferably about 10 μm to about 20 μm. Plurality of V shaped grooves 338 can be spaced apart from each other by a distance 328 of about 1 μm to about 50 μm in a direction perpendicular to cutting edge 314 and by a distance of about 100 μm (measured tip-to-tip) in a direction parallel to cutting edge 314. Width 322 of each of plurality of V shaped grooves 338 is preferably small enough that hair does not get trapped in or between plurality of V shaped grooves 338.

It is believed, without being held to theory, that laser ablating the surface of a blade edge can influence friction and cutting force.

Figure 18A:
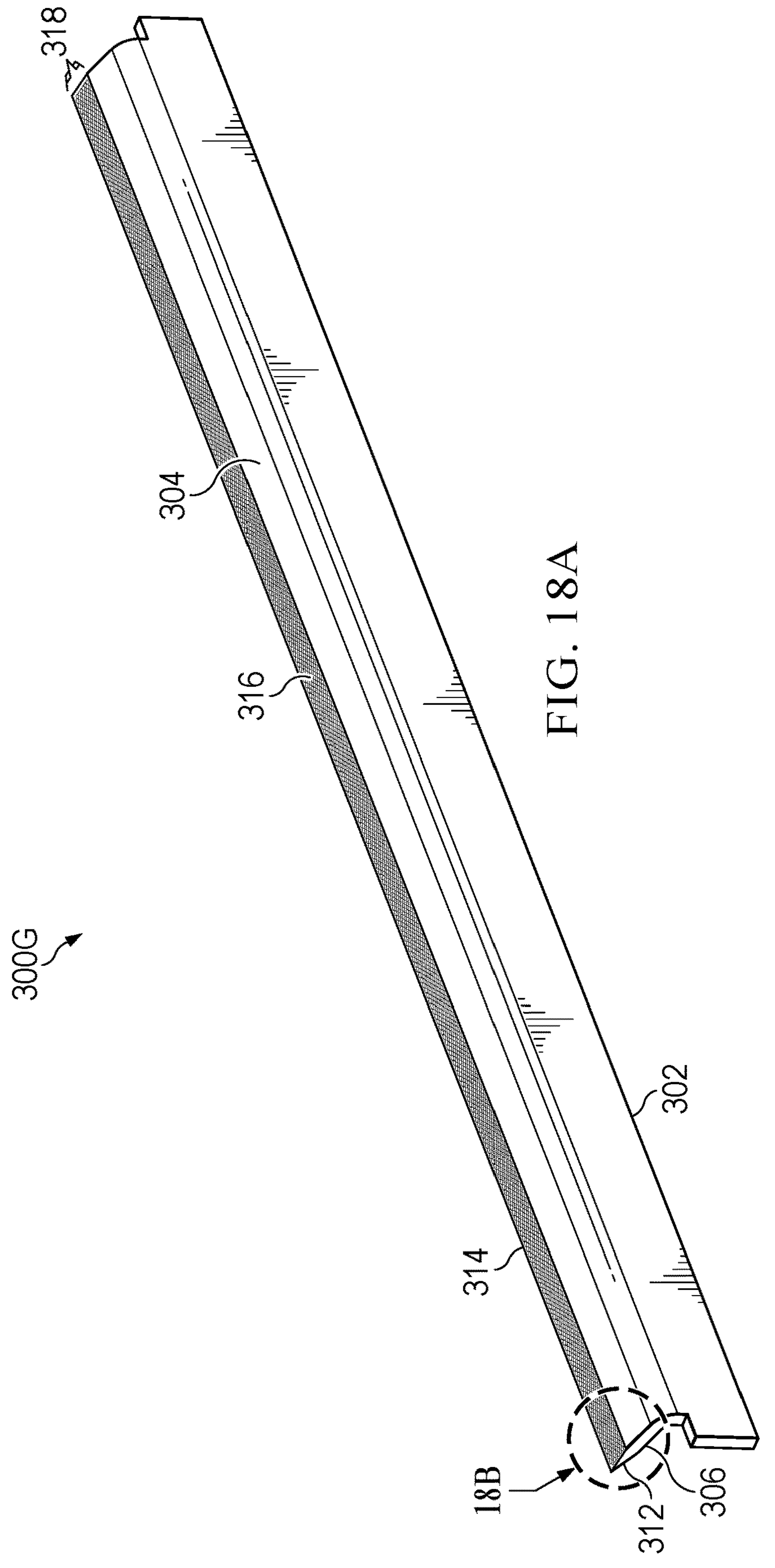
FIG. 18A is a top perspective view of a seventh example razor blade for use in the shaving razor of FIG. 1.
Figure 18B:
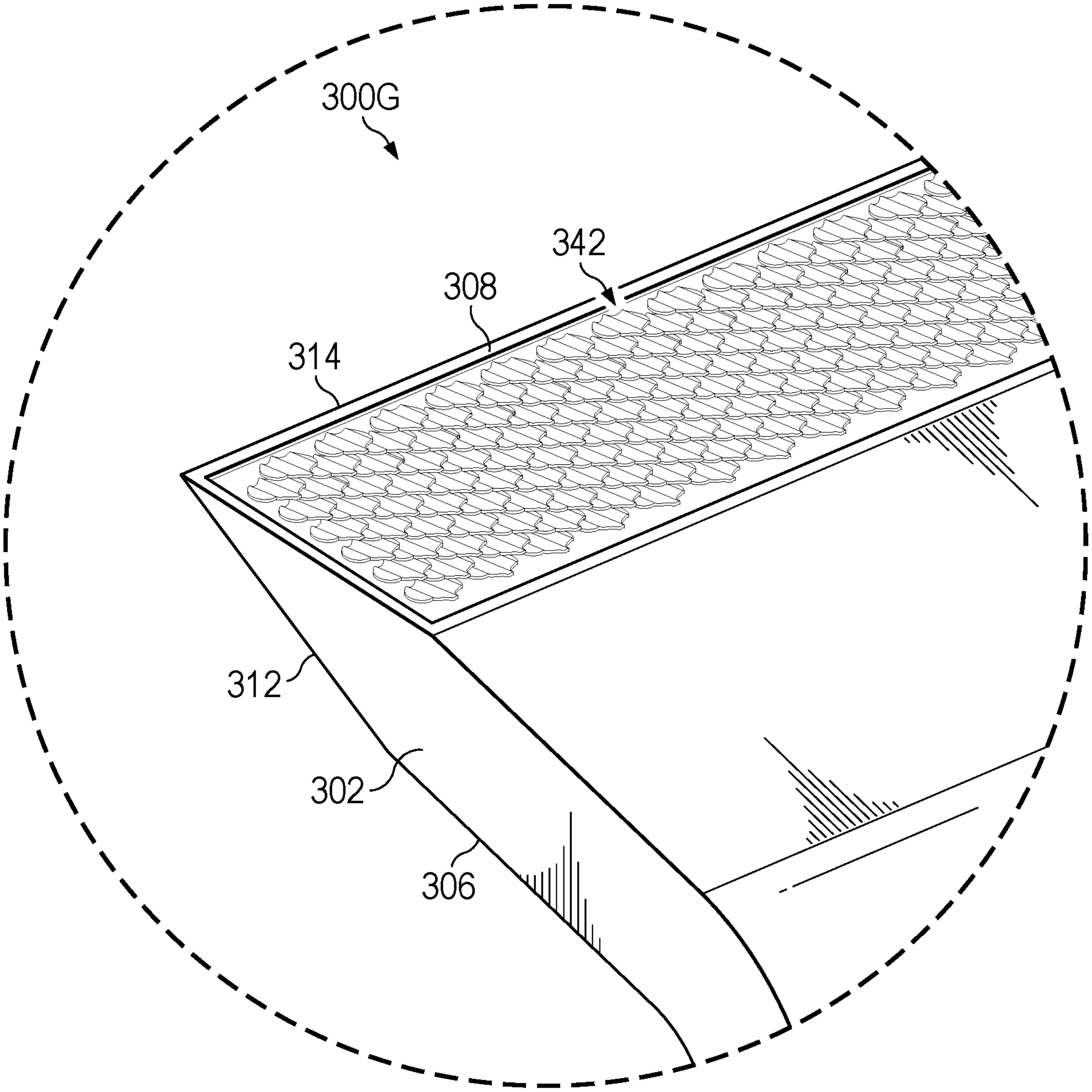
FIG. 18B is an enlarged view of a portion of the razor blade of FIG. 18A.

Referring to FIGS. 18A-18B, a seventh example razor blade 300G is illustrated that can be used as razor blade 300 in shaving razor cartridge 104 of shaving razor 100. Razor blade 300G includes substrate 302 having first facet 308 formed on first surface 304 of substrate 302 and second facet 312 formed on second surface 306 of substrate 302. First facet 308 and second facet 312 converge to define cutting edge 314 of razor blade 300G. First textured surface 316 is formed on first facet 308, for example, by laser ablation. In one example, the laser ablation could be performed by an ultrashort pulse laser set at a power setting of 8 μJ and a wavelength of 1030 nm. The beam diameter used could be approximately 50% of the depth of the grooves being formed. Preferably, the laser pulse rate/duration, airflow, and atmosphere during the laser ablation are controlled to avoid "recast" being formed on the surfaces of the substrate around the features of the textured surfaces. Alternatively, secondary operations could be performed on the surfaces of the substrate around the features of the textured surfaces (e.g., machining, grinding, chemical etching, etc.) to reduce/remove any surface features developed by recasting.

First textured surface 316 is spaced apart from cutting edge 314 by a distance 326 of about 0.05 μm to about 2 μm and can extend about 2 μm to about 40 μm in a direction perpendicular to cutting edge 314. Distance 326, as used herein, is the distance between cutting edge 314 and the beginning or edge of first textured surface 316.

In razor blade 300G, first textured surface 316 includes a first plurality of elements 318 that extend into a top surface 310 of first facet 308 and form a bio-inspired pattern 342. Bio-inspired pattern 342 can mimic a variety of biologically inspired patterns, such as shark skin, fish scales, snakeskin, leaf patterns, etc., and can have a depth between about 0.01 μm and about 20 μm, preferably between about 0.01 μm and about 0.2 μm. Given a particular thickness of substrate 302 and the angles of first facet 308 and second facet 312, it is possible to select depth to attempt to maximize the volume of lubrication/water that can be entrained in bio-inspired pattern 342 while simultaneously minimizing structural weakening of razor blade 300G.

It is believed, without being held to theory, that laser ablating the surface of a blade edge can influence friction and cutting force.

Figure 19:
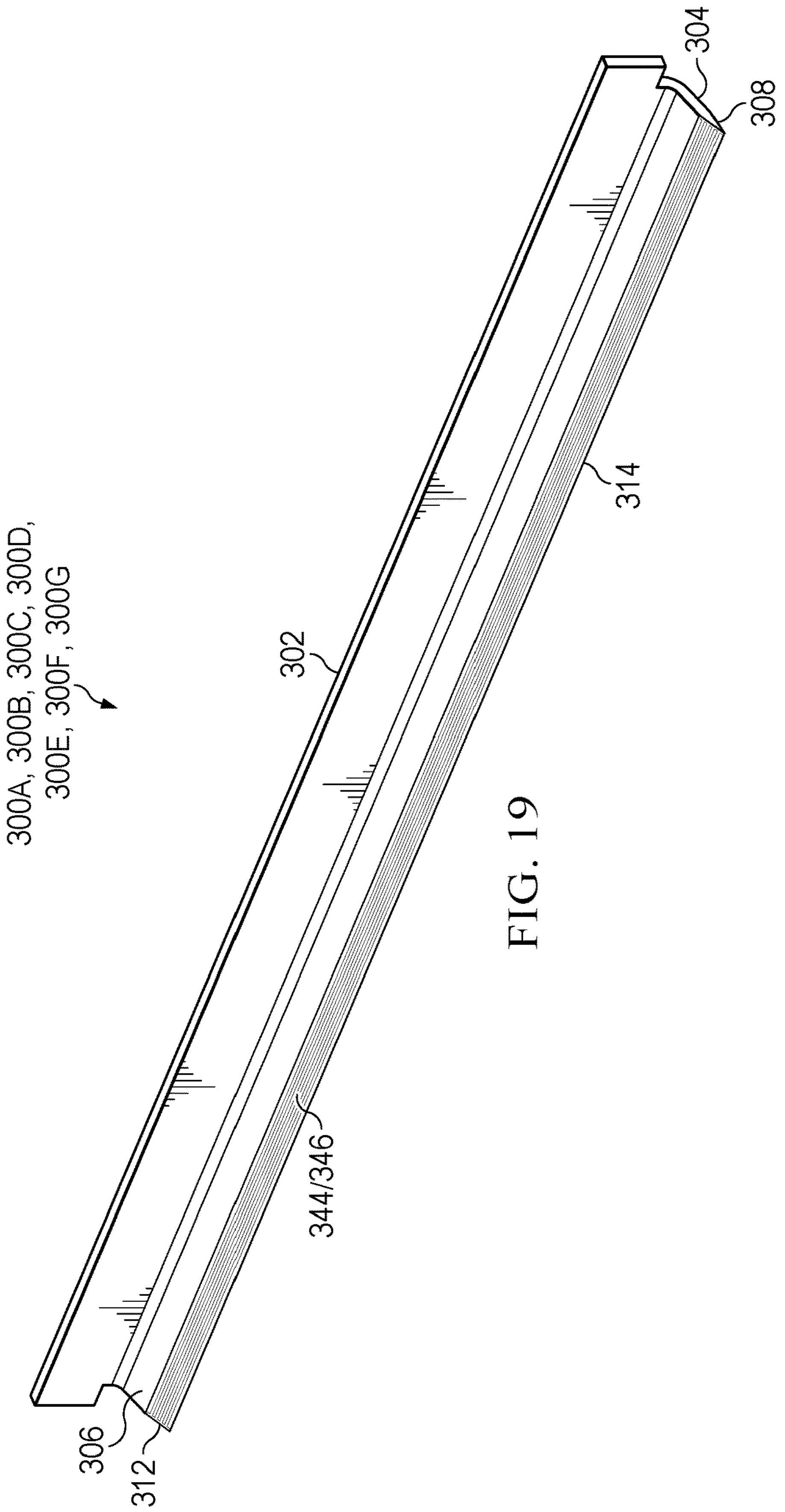
FIG. 19 is a bottom perspective view of the example razor blades for use in the shaving razor of FIG. 1.

As shown in FIG. 19, any of the razor blades 300A, 300B, 300C, 300D, 300E, 300F, 300G described above can also have a second textured surface 344 formed on second facet 312. Second textured surface 344 can include a second plurality of elements 346, which could be any of first plurality of grooves 330, second plurality of grooves 332, first plurality of grooves 330 and second plurality of grooves 332 (rectangular columns), first plurality of grooves 330 and third plurality of grooves 334 (angled columns), plurality of dimples 336, plurality of V shaped grooves 338, or bio-inspired pattern 342 described above. To maintain the structural integrity of razor blade 300A, 300B, 300C, 300D, 300E, 300F, 300G, first plurality of elements 318 on first facet 308 can be offset from second plurality of elements 346 on second facet 312 so that first plurality of elements 318 and second plurality of elements 346 are not directly across from each other or do not overlap.

It is understood by those skilled in the art that the razor blade (e.g., razor blade 300A, 300B, 300C, 300D, 300E, 300F, 300G) may be a unitary member that is flat, a unitary member that is bent (as shown in the figures), or may include a planar blade attached (e.g., welded) to a flat metal support or a bent metal support.

Figure 20:
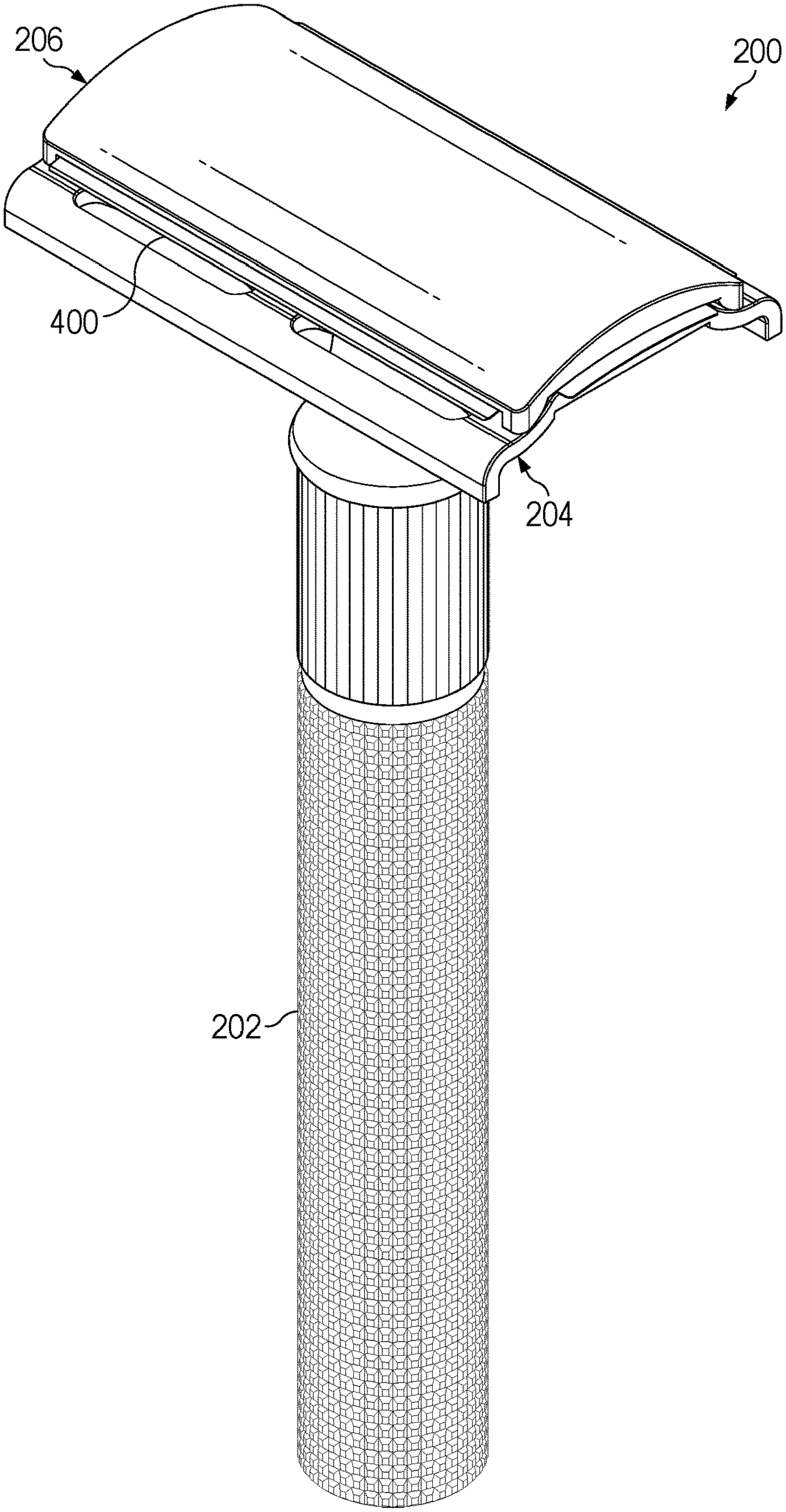
FIG. 20 is a top perspective view of a second example shaving razor.
Figure 21:
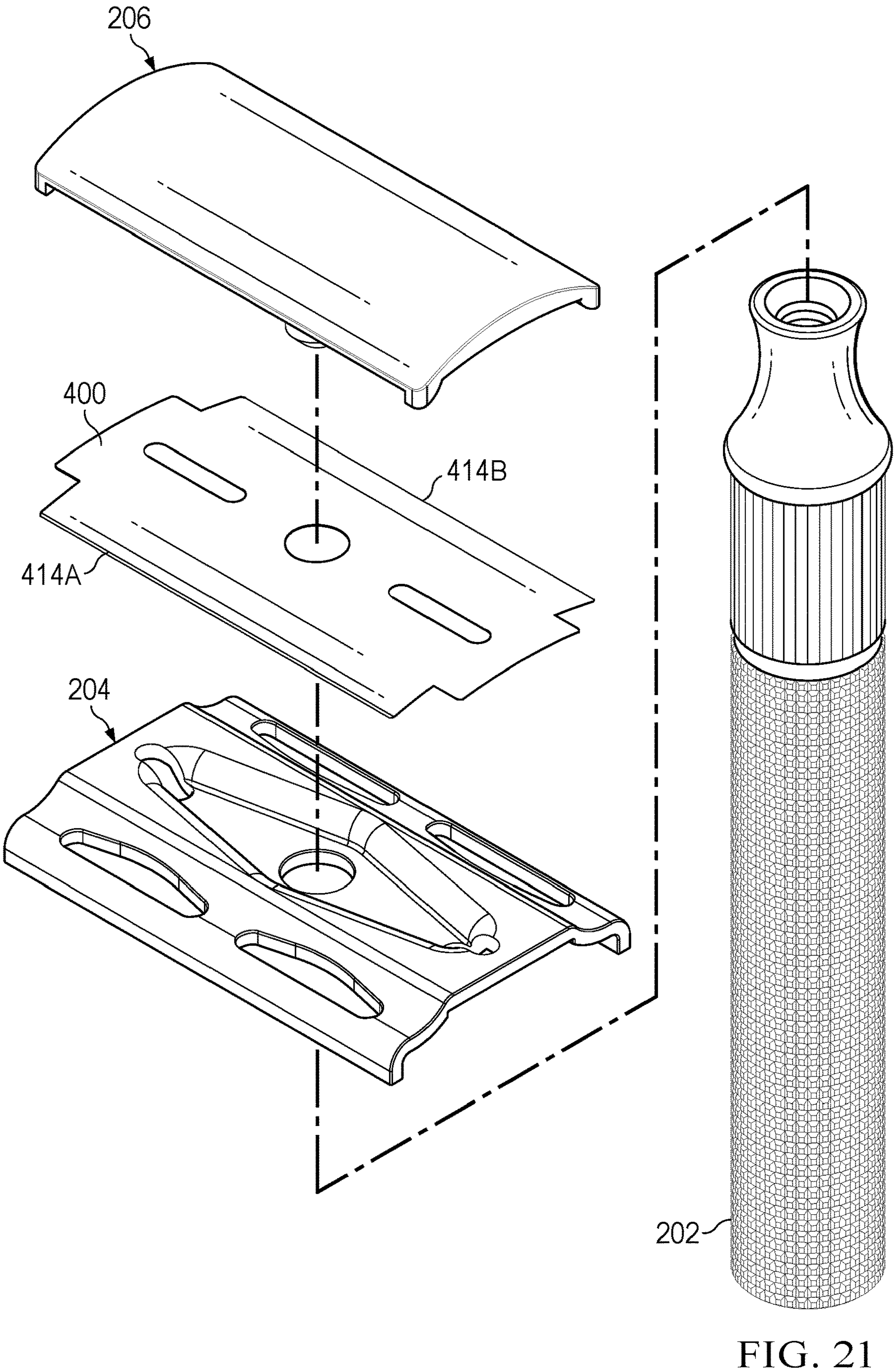
FIG. 21 is an exploded view of the shaving razor of FIG. 20.
Figure 22A:
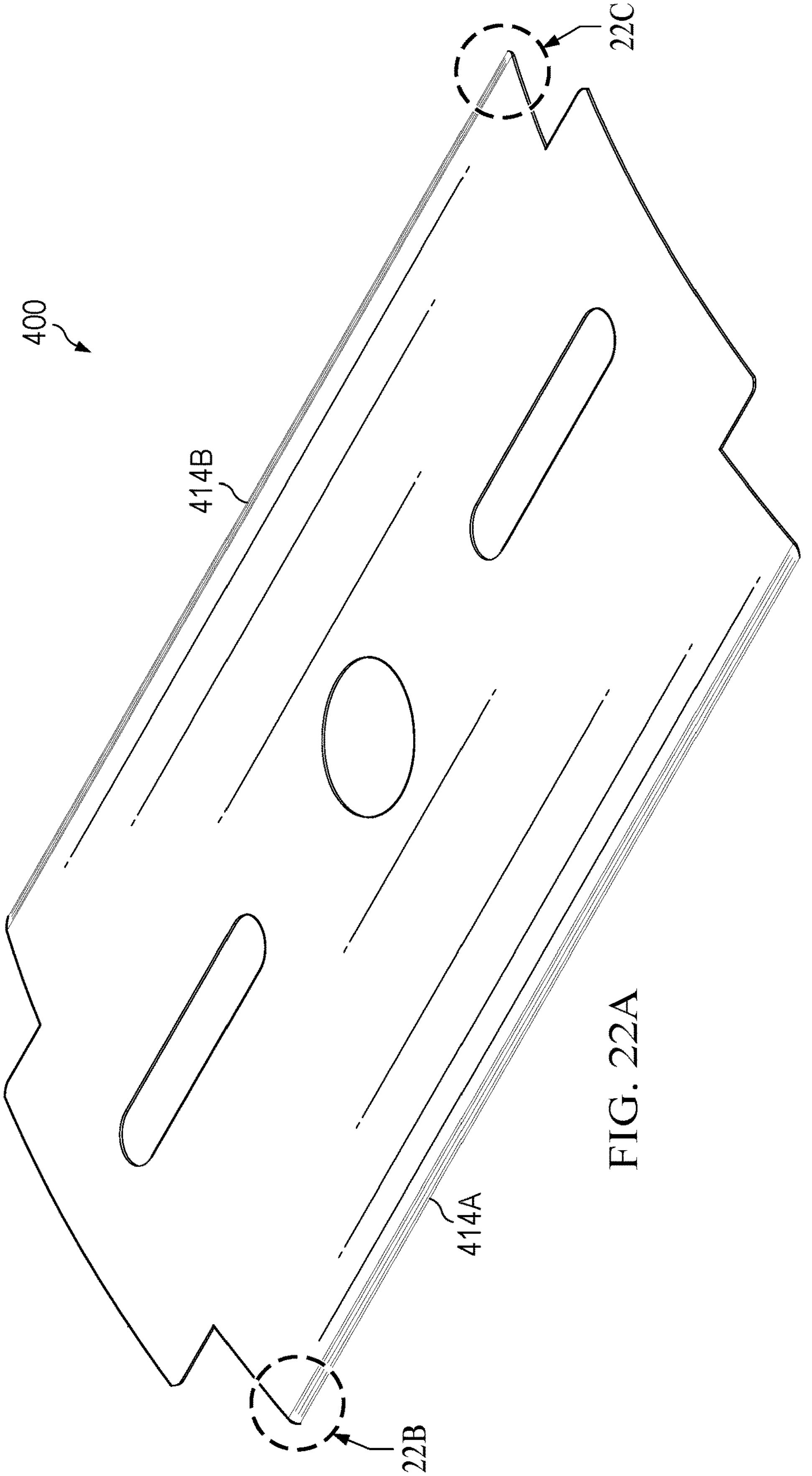
FIG. 22A is a top perspective view of an example razor blade for use in the shaving razor of FIG. 20.
Figure 22B:
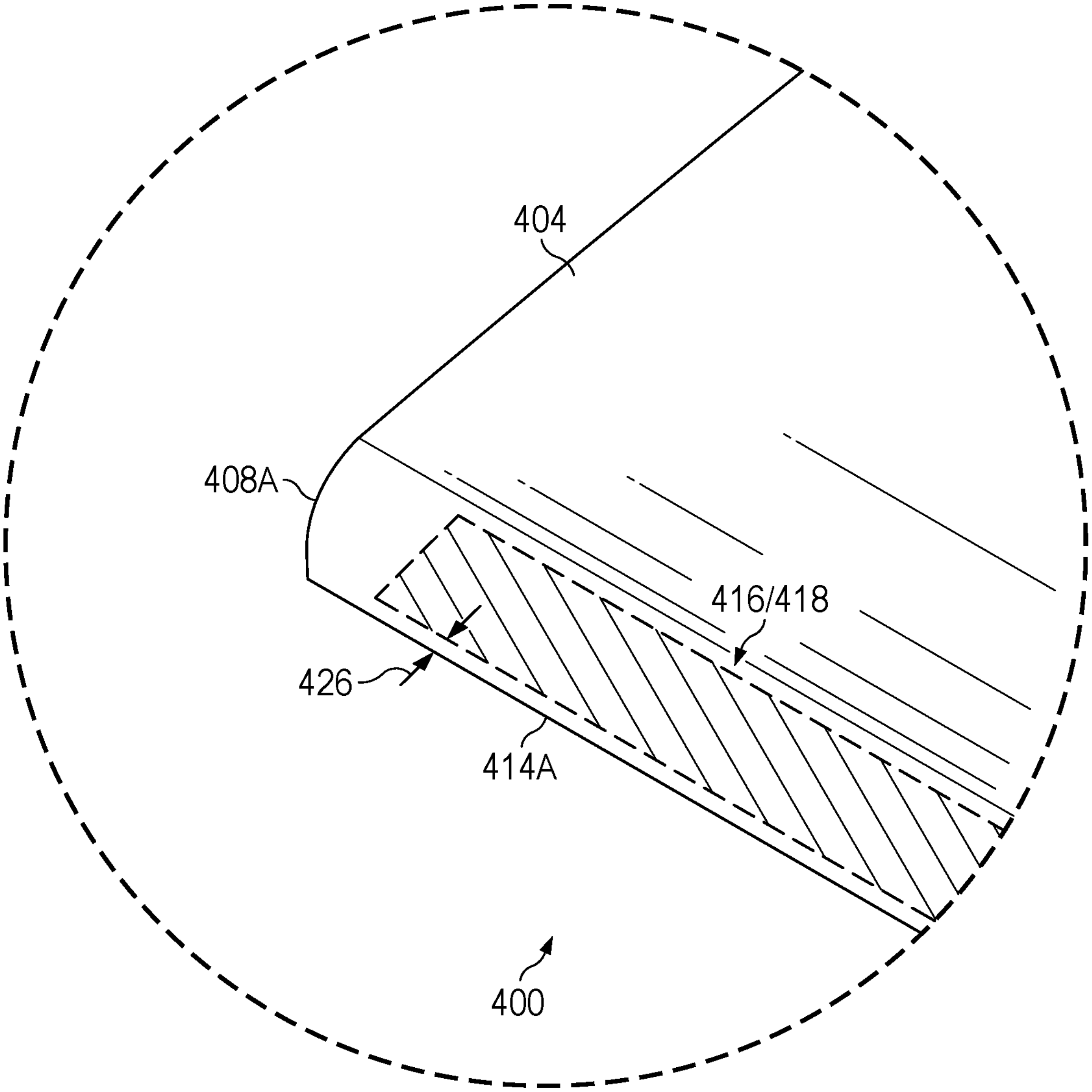
FIG. 22B is an enlarged view of a portion of the razor blade of FIG. 22A.
Figure 22C:
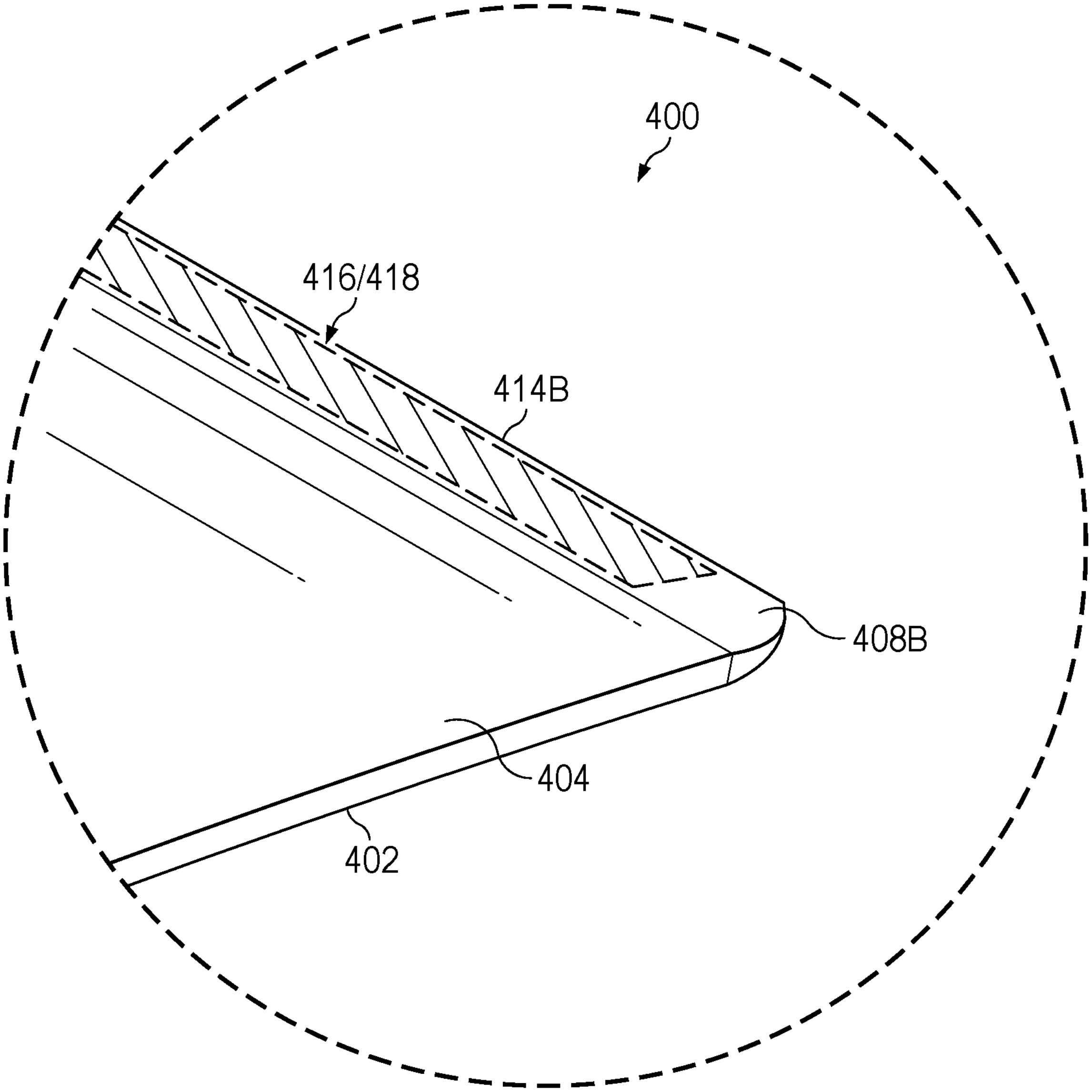
FIG. 22C is an enlarged view of another portion of the razor blade of FIG. 22A.
Figure 23A:
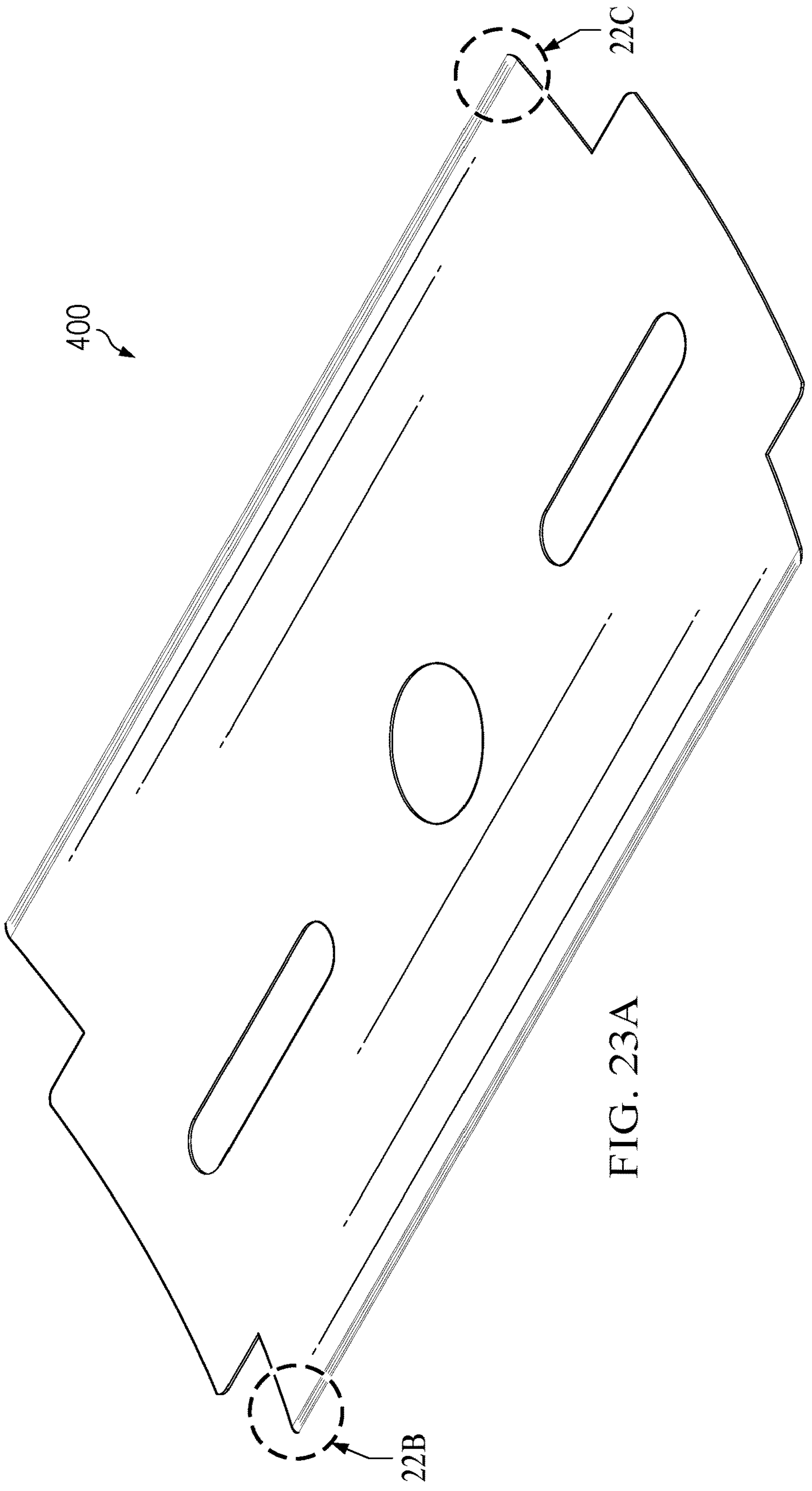
FIG. 23A is a bottom perspective view of the example razor blade of FIG. 22A.
Figure 23B:
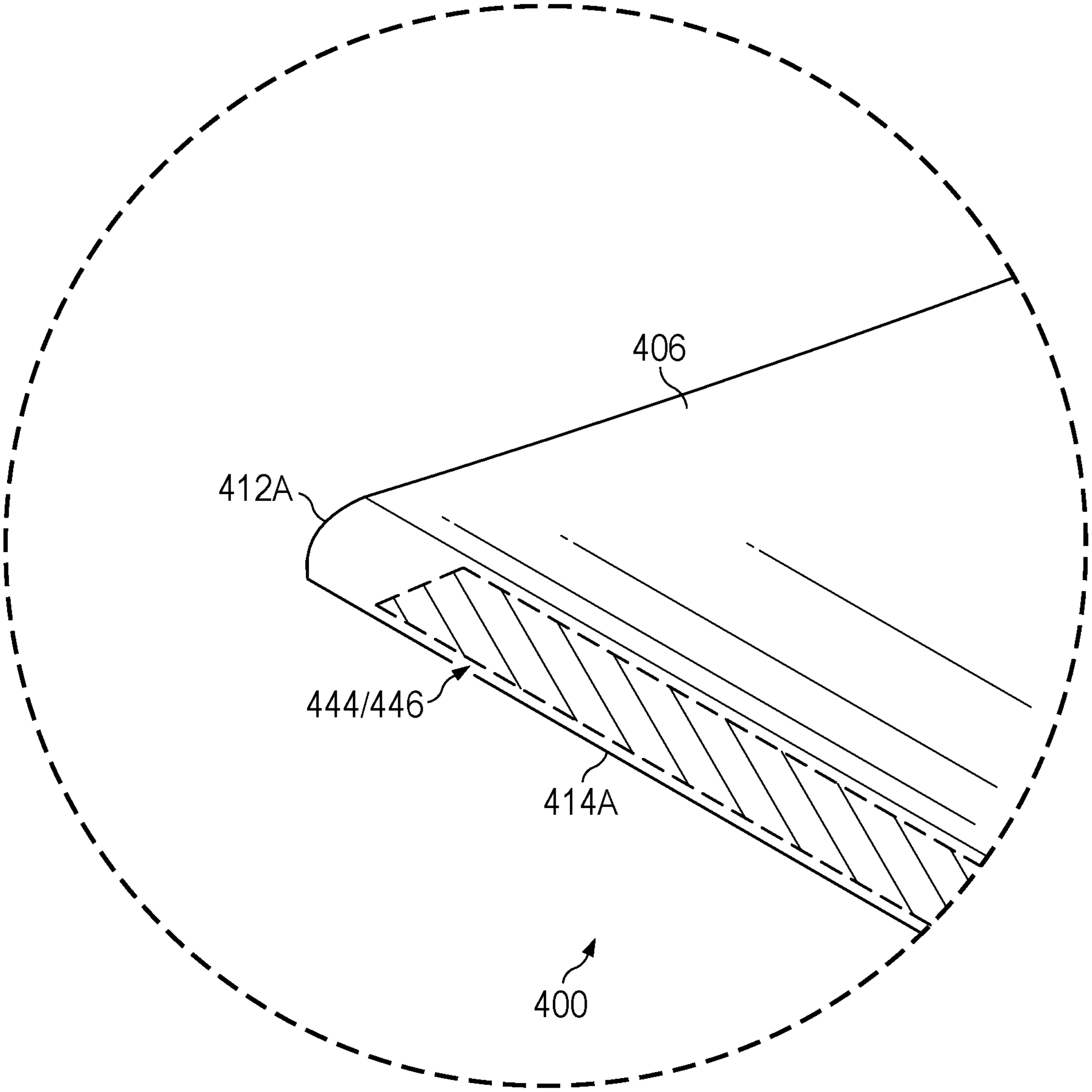
FIG. 23B is an enlarged view of a portion of the razor blade of FIG. 23A.
Figure 23C:
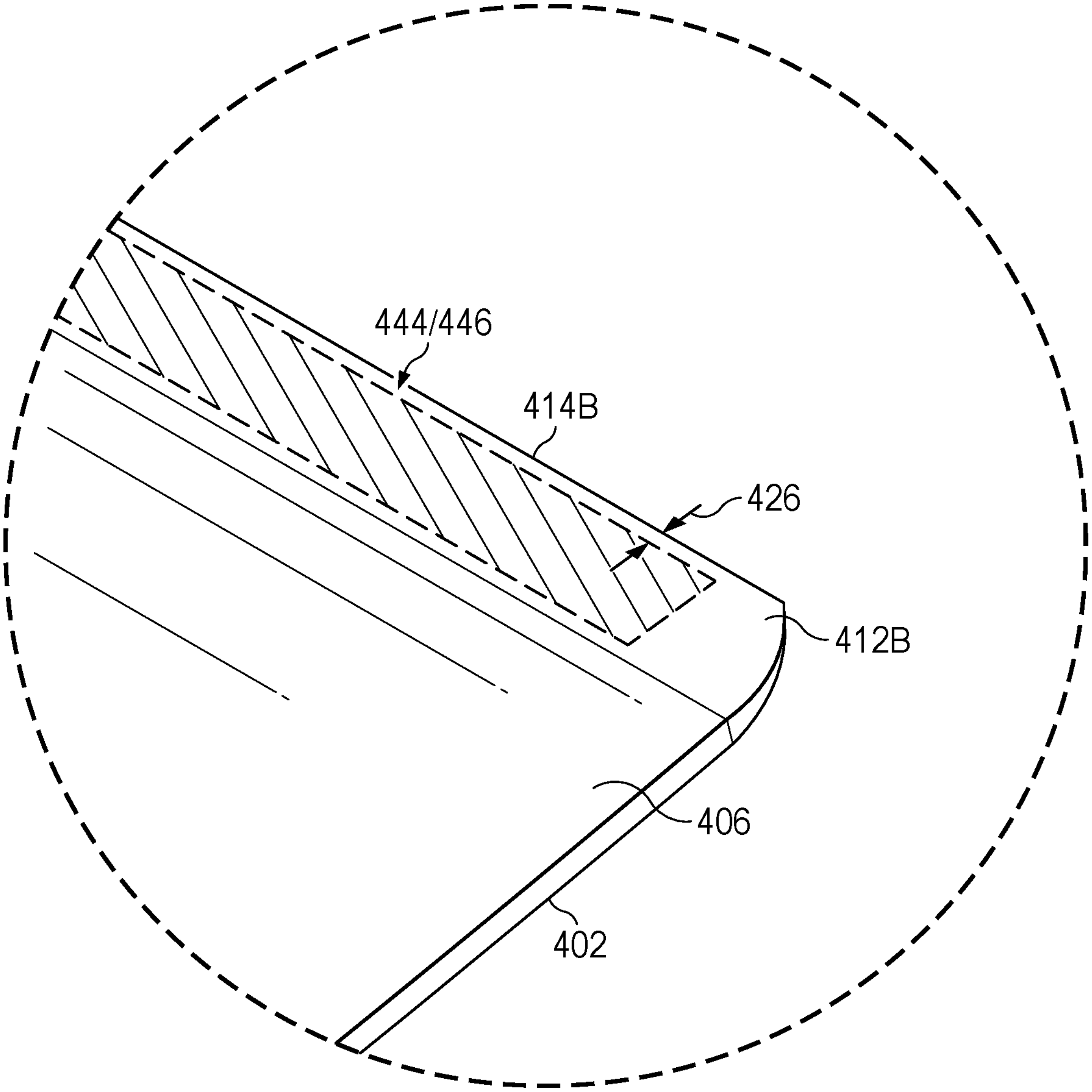
FIG. 23C is an enlarged view of another portion of the razor blade of FIG. 23A.

Referring to FIGS. 20-21, a second example shaving razor 200 is shown, which generally includes a handle 202, a blade platform 204 configured to support one or more razor blades 400, and a housing cover 206. Blade platform 204 can be connected to, or removably connected to, handle 202 and housing cover 206 is removably secured on top of blade platform 204 to secure razor blade 400 between blade platform 204 and housing cover 206, such that a cutting edge of razor blade 400 is accessible between blade platform 204 and housing cover 206. As shown and described herein, shaving razor 200 is a double-sided shaving razor and a first cutting edge 414A on a front portion of razor blade 400 accessible between a front portion of blade platform 204 and a front portion of housing cover 206 and a second cutting edge 414B on a rear portion of razor blade 400 accessible between a rear portion of blade platform 204 and a rear portion of housing cover 206. Blade platform 204 and housing cover 206 can be plastic or a metal material, such as aluminum, anodized aluminum, stainless steel, titanium, etc. with a Brinell hardness of 30 to 100.

As shown in FIGS. 22A-23C, razor blade 400 includes a substrate 402 having a first facet 408A formed on a first surface 404 of substrate 402 at the front portion of razor blade 400, a first facet 408B formed on first surface 404 at the rear portion of razor blade 400, a second facet 412A formed on a second surface 406 of substrate 402 at the front portion of razor blade 400, and a second facet 412B formed on second surface 406 at the rear portion of razor blade 400. First facet 408A and second facet 412A converge to define cutting edge 414A of razor blade 400 and first facet 408B and second facet 412B converge to define cutting edge 414B of razor blade 400.

First textured surface 416 is spaced apart from cutting edges 414A, 414B by a distance 426 of about 0.05 μm to about 2 μm and can extend about 2 μm to about 40 μm in a direction perpendicular to cutting edges 414A, 414B. Distance 426, as used herein, is the distance between cutting edge 314 and the beginning or edge of first textured surface 316.

To manage the friction as razor blade 400 passes over the skin of the user during shaving, a first facet 408A on the front portion of razor blade 400 and/or a first facet 408B on the rear portion of razor blade 400 could have a first textured surface 416 including a first plurality of elements 418 formed on first facets 408A, 408B, for example, by laser ablation. In one example, the laser ablation could be performed by an ultrashort pulse laser set at a power setting of 8 μJ and a wavelength of 1030 nm. The beam diameter used could be approximately 50% of the depth of the grooves being formed. Preferably, the laser pulse rate/duration, air-flow, and atmosphere during the laser ablation are controlled to avoid "recast" being formed on the surfaces of the substrate around the features of the textured surfaces. Alternatively, secondary operations could be performed on the surfaces of the substrate around the features of the textured surfaces (e.g., machining, grinding, chemical etching, etc.) to reduce/remove any surface features developed by recasting. In addition, a second facet 412A on the front portion of razor blade 400 and/or a second facet 412B on the rear portion of razor blade 400 could have a second textured surface 444 including a second plurality of elements 446. First plurality of elements 418 and/or second plurality of elements 446 could comprise any of first plurality of grooves 330, second plurality of grooves 332, combination of first plurality of grooves 330 and second plurality of grooves 332 (rectangular columns), combination of first plurality of grooves 330 and third plurality of grooves 334 (angled columns), plurality of dimples 336, plurality of V shaped grooves 338, or bio-inspired pattern 342, as described above.

Razor blade 400 can also have a conforming first coating that covers at least cutting edge 414A and cutting edge 414B of razor blade 400, but could also cover first textured surfaces 416A, 416B and/or second textured surfaces 444A, 444B. The conforming first coating could be a hard coating, a lubricous coating, or a hard coating and a lubricous coating.

It is understood by those skilled in the art that the razor blade (e.g., razor blade 400) may be a unitary member (as shown in the figures) or may include a planar blade attached (e.g., welded) to an arcuate metal support.

Figure 24:
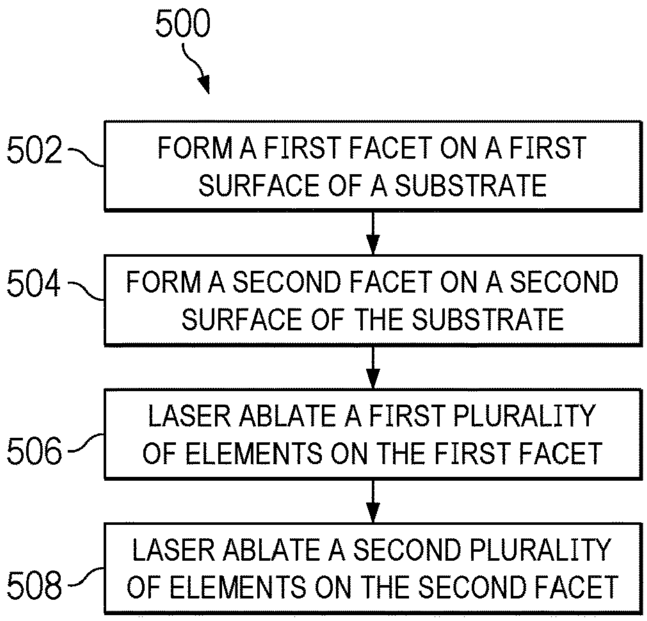
FIG. 24 is a flowchart illustrating an example method for forming a razor blade.

Referring to FIG. 24, an example method 500 for forming a razor blade (e.g., razor blade 300A, 300B, 300C, 300D, 300E, 300F, 300G, 400) is illustrated.

At Step 502, a first facet (e.g., first facet 308, 408A, 408B) is formed on a first surface (e.g., first surface 304, 404) of a substrate (e.g., substrate 302, 402). The first facet can be formed by grinding and honing the substrate with an abrasive wheel, as is known to those skilled in the art, or can be done by removing material to create the first facet by laser ablation.

At Step 504, a second facet (e.g., second facet 312, 412A, 412B) is formed on a second surface (e.g., second surface 306, 406) of the substrate, opposite the first surface, such that the first facet and the second facet converge to define a cutting edge (e.g., cutting edge 314, 414A, 414B). The second facet can be formed by grinding and honing the substrate with as abrasive wheel, as is known to those skilled in the art, or can be done by removing material to create the first facet by laser ablation.

At Step 506, a first plurality of elements (e.g., first plurality of elements 318, 418) are laser ablated on the first facet. Laser ablating of the first plurality of elements forms a first textured surface (e.g., first textured surface 316, 416) that extends about 2 μm to about 40 μm in a direction perpendicular to the cutting edge. The first plurality of elements laser ablated on the first facet can be any of first plurality of grooves 330, second plurality of grooves 332, first plurality of grooves 330 and second plurality of grooves 332 (rectangular columns), first plurality of grooves 330 and third plurality of grooves 334 (angled columns), plurality of dimples 336, plurality of V shaped grooves 338, or bio-inspired pattern 342 described above. As described above, the first plurality of elements can have a depth between about 0.01 μm and about 20 μm, preferably about 0.01 μm to 0.2 μm, be spaced apart from the cutting edge about 0.05 μm to about 2 μm, can have a width of about 1 μm to about 50 μm, and can be spaced apart from each other a distance of about 1 μm to about 50 μm.

In addition, if desired, at optional Step 508 a second plurality of elements (e.g., second plurality of elements 346, 446) could be laser ablated on the second facet. Laser ablating of the second plurality of elements forms a second textured surface (e.g., second textured surface 344, 444) that extends about 2 μm to about 40 μm in a direction perpendicular to the cutting edge. The second plurality of elements laser ablated on second first facet can be any of first plurality of grooves 330, second plurality of grooves 332, first plurality of grooves 330 and second plurality of grooves 332 (rectangular columns), first plurality of grooves 330 and third plurality of grooves 334 (angled columns), plurality of dimples 336, plurality of V shaped grooves 338, or bio-inspired pattern 342 described above. As described above, the second plurality of elements can have a depth between about 0.01 μm and about 20 μm, be spaced apart from the cutting edge about 0.05 μm to about 2 μm, can have a width of about 1 μm to about 50 μm, and can be spaced apart from each other a distance of about 1 μm to about 50 μm. A conforming first coating can also be applied that covers at least the cutting edge of the razor blade. If desired, the conforming first coating can also be applied to cover the first plurality of elements and/or the second plurality of elements.

Figure 25:
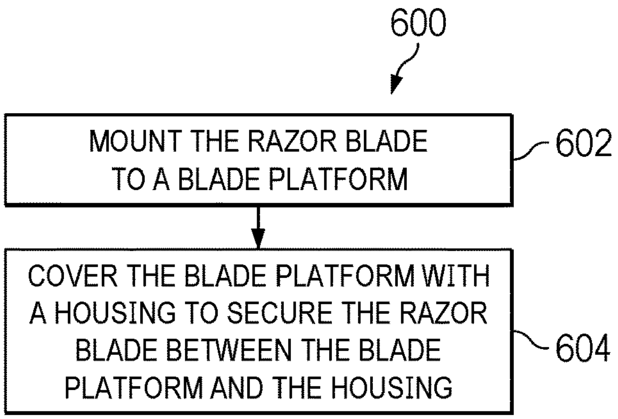
FIG. 25 is a flowchart illustrating an example method of making a shaving razor cartridge.

Referring to FIG. 25, an example method 600 of making a shaving razor cartridge (e.g., shaving razor cartridge 104) with a razor blade (e.g., razor blade 300A, 300B, 300C, 300D, 300E, 300F, 300G) formed by method 500 is illustrated.

At Step 602, the razor blade formed by method 500 is mounted to a blade platform (e.g., blade platform 114). For example, the razor blade can be mounted to blade platform by positioning the razor blade within slots (e.g., slots 116) formed in the blade platform.

At Step 604, the blade platform is covered by a housing (e.g., housing 106) to secure the razor blade between the blade platform and the housing. The housing can be plastic or a metal material, such as aluminum, anodized aluminum, stainless steel, titanium, etc. with a Brinell hardness of 30 to 100. The housing can cover the blade platform such that the razor blade is retained within the housing, is positioned between a front portion (e.g., front portion 108) and a rear portion (e.g., rear portion 110) of the housing, and is accessible through an elongated window (e.g., elongated window 112) formed in the housing between the front portion and the rear portion. As referred to herein, the front portion of the housing is the portion of the housing that engages the skin of a user before the razor blade and the rear portion of the housing is the portion of the housing that engages the skin of the user after the razor blade.

Figure 26:
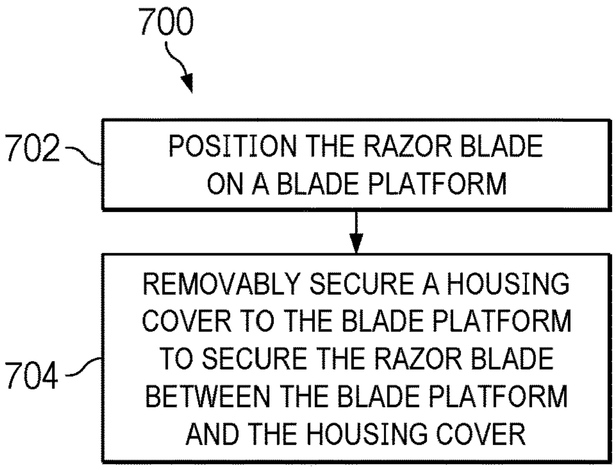
FIG. 26 is a flowchart illustrating an example method of making a shaving razor.

Referring to FIG. 26, an example method 700 of making a shaving razor (e.g., shaving razor 200) with a razor blade (e.g., razor blade 400) formed by method 500 is illustrated.

At Step 702, the razor blade formed by method 500 is positioned on a blade platform (e.g., blade platform 204). The blade platform is configured to support the razor blade and can be connected to, or removably connected to, a handle (e.g., handle 202).

At Step 704, a housing cover (e.g., housing cover 206) is removably secured to the blade platform to secure the razor blade between the blade platform and the housing cover. The housing cover can be removably secured on top of the blade platform such that a cutting edge (e.g., cutting edge 414A, 414B) of the razor blade is accessible between the blade platform and the housing cover. The shaving razor can be a double-sided shaving razor and a first cutting edge (e.g., cutting edge 414A) on a front portion of the razor blade can be accessible between a front portion of the blade platform and a front portion of the housing cover and a second cutting edge (e.g., cutting edge 414B) on a rear portion of the razor blade can be accessible between a rear portion of the blade platform and a rear portion of the housing cover. The blade platform and housing cover can be plastic or a metal material, such as aluminum, anodized aluminum, stainless steel, titanium, etc. with a Brinell hardness of 30 to 100.

The dimensions and values disclosed herein are not to be understood as being strictly limited to the exact numerical values recited. The dimensions should not be held to an impossibly high standard of metaphysical identity that does not allow for discrepancies due to typical manufacturing and measuring tolerances. Therefore, the term "about" should be interpreted as being within typical manufacturing and measuring tolerances.

To the extent that any meaning or definition of a term in this document conflicts with any meaning or definition of the same term in another document, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A razor blade, comprising:

a substrate having a first facet and a second facet that converge to define a cutting edge; and a first textured surface formed on the first facet; wherein the first textured surface includes a first plurality of elements with a depth between about 0.01 μm and about 20 μm; and the first textured surface is spaced apart from the cutting edge by about 0.05 μm to about 2 μm, wherein the first plurality of elements have an increasing depth with increasing distance from the cutting edge.

2. The razor blade of claim 1, comprising a second textured surface formed on the second facet, wherein the second textured surface includes a second plurality of elements with a depth between about 0.01 μm and about 20 μm and the second textured surface is spaced apart from the cutting edge by about 0.05 μm to about 2 μm.

3. The razor blade of claim 2, wherein the first plurality of elements on the first facet are offset from the second plurality of elements on the second facet.

4. The razor blade of claim 1, comprising a conforming first coating covering at least the cutting edge.

5. The razor blade of claim 1, wherein the depth of the first plurality of elements increases with increasing distance from the cutting edge.

6. The razor blade of claim 1, wherein the first plurality of elements are spaced apart from each other by a distance of about 1 μm to about 50 μm.

7. The razor blade of claim 1, wherein the first plurality of elements comprise a first plurality of grooves extending into a top surface of the first facet, the first plurality of grooves extending longitudinally parallel to the cutting edge.

8. The razor blade of claim 1, wherein the first plurality of elements comprise a second plurality of grooves extending into a top surface of the first facet, the second plurality of grooves extending perpendicular to the cutting edge.

9. The razor blade of claim 1, wherein the first plurality of elements comprise a first plurality of grooves extending into a top surface of the first facet, the first plurality of grooves extending longitudinally parallel to the cutting edge, and a second plurality of grooves extending into the top surface of the first facet, the second plurality of grooves extending perpendicular to the cutting edge.

10. The razor blade of claim 1, wherein the first plurality of elements comprise a first plurality of grooves extending into a top surface of the first facet, the first plurality of grooves extending longitudinally parallel to the cutting edge, and a third plurality of grooves extending into the top surface of the first facet, the third plurality of grooves extending at an angle of about 20 degrees to about 70 degrees relative to the cutting edge.

11. The razor blade of claim 1, wherein the first plurality of elements comprises a plurality of dimples.

12. The razor blade of claim 1, wherein each of the first plurality of elements comprises an arcuate base surface.

13. The razor blade of claim 1, wherein the first textured surface extends about 2 μm to about 40 μm in a direction perpendicular to the cutting edge.

14. A shaving razor including the razor blade of claim 1, the shaving razor comprising a blade platform, wherein the razor blade is mounted to the blade platform.

* * * * *